US012440836B2

(12) United States Patent
De Haas et al.

(10) Patent No.: US 12,440,836 B2
(45) Date of Patent: Oct. 14, 2025

(54) MANIFOLDS FOR MICROFLUIDIC CHIPS, MICROFLUIDIC CHIPS, AND RELATED METHODS AND ASSEMBLIES

(71) Applicant: INTERFACE FLUIDICS LTD., Calgary (CA)

(72) Inventors: Thomas De Haas, Edmonton (CA); Zahraa Elshabasy, Mississauga (CA); Zahra Barikbin, Edmonton (CA); Dylan Vaclavik, Victoria (CA)

(73) Assignee: INTERFACE FLUIDICS LTD., Calgary (CA)

( * ) Notice: Subject to any disclaimer, the term of this patent is extended or adjusted under 35 U.S.C. 154(b) by 0 days.

(21) Appl. No.: 18/559,595

(22) PCT Filed: May 27, 2022

(86) PCT No.: PCT/CA2022/050860
§ 371 (c)(1),
(2) Date: Nov. 8, 2023

(87) PCT Pub. No.: WO2022/251951
PCT Pub. Date: Dec. 8, 2022

(65) Prior Publication Data

US 2024/0253034 A1 Aug. 1, 2024

Related U.S. Application Data

(60) Provisional application No. 63/195,746, filed on Jun. 2, 2021.

(51) Int. Cl.
*B01L 3/00* (2006.01)

(52) U.S. Cl.
CPC ... *B01L 3/502715* (2013.01); *B01L 3/502707* (2013.01); *B01L 2200/027* (2013.01); *B01L 2400/0487* (2013.01)

(58) Field of Classification Search
CPC ......... B01L 3/502715; B01L 3/502707; B01L 2200/027; B01L 2400/0487; B01L 2200/0689; B01L 9/527
See application file for complete search history.

(56) References Cited

U.S. PATENT DOCUMENTS 5,964,239 A 10/1999 Loux et al.
6,319,476 B1 11/2001 Victor, Jr. et al.
(Continued)

FOREIGN PATENT DOCUMENTS

CN 204448038 U 7/2015
CN 107703036 B 6/2020
(Continued)

OTHER PUBLICATIONS

A Microfluidic-Enabled Mechanical Microcompressor for the Immobilization of Live Single- and Multi-Cellular Specimens. Yan et al. Microsc Microanal. Feb. 2014; 20(1): 141-151. doi: 10.1017/S1431927613014037.
(Continued)

*Primary Examiner* — Jennifer Wecker
*Assistant Examiner* — Steven Ray Castaneda
(74) *Attorney, Agent, or Firm* — ABM INTELLECTUAL PROPERTY INC.; Adrienne Bieber McNeil

(57) ABSTRACT

A microfluidic assembly includes a jack for forcing a base and a cover together to sandwich a microfluidic chip between base and the cover, with the base and the cover bearing against the microfluidic chip to apply a confining pressure to the microfluidic chip, and with a seal compressed between the microfluidic chip and the base to seal a fluid channel of the base in fluid communication with a microfluidic inlet of the microfluidic chip. A microfluidic chip includes a silicon wafer having at least a first microfluidic channel etched therein, and a chemically strengthened glass
(Continued)

panel bonded to the silicon wafer to cover the microfluidic channel.

22 Claims, 13 Drawing Sheets

(56) References Cited

U.S. PATENT DOCUMENTS

| | | | | |
|---|---|---|---|---|
| 6,811,668 | B1 * | 11/2004 | Berndt | B01L 3/502715 204/601 |
| 6,832,787 | B1 | 12/2004 | Renzi | |
| 6,926,313 | B1 | 8/2005 | Renzi | |
| 7,341,966 | B2 | 3/2008 | Marques | |
| 9,488,586 | B2 | 11/2016 | He et al. | |
| 10,001,435 | B1 | 6/2018 | Sinton et al. | |
| 10,801,628 | B2 | 10/2020 | Forrest et al. | |
| 11,391,393 | B2 | 7/2022 | Sinton et al. | |
| 2002/0045265 | A1 | 4/2002 | Bergh et al. | |
| 2003/0008411 | A1 | 1/2003 | Van Dam et al. | |
| 2004/0137604 | A1 | 7/2004 | Goodman et al. | |
| 2006/0063160 | A1 | 3/2006 | West et al. | |
| 2008/0047836 | A1 | 2/2008 | Strand et al. | |
| 2010/0320748 | A1 | 12/2010 | Oever et al. | |
| 2014/0322100 | A1 | 10/2014 | Laermer et al. | |
| 2015/0093815 | A1 * | 4/2015 | Kiani | F16K 99/0059 422/503 |
| 2020/0215541 | A1 | 7/2020 | Abedini et al. | |
| 2020/0309285 | A1 | 10/2020 | Sinton et al. | |
| 2021/0316305 | A1 * | 10/2021 | Yoshitomi | C12M 23/16 |
| 2021/0339258 | A1 | 11/2021 | De Haas et al. | |
| 2023/0219082 | A1 | 7/2023 | Ahitan et al. | |

FOREIGN PATENT DOCUMENTS

| | | | |
|---|---|---|---|
| EP | 3235568 | A1 | 10/2017 |
| WO | 2000078456 | A1 | 12/2000 |
| WO | 03089138 | A2 | 10/2003 |
| WO | 2005016532 | A2 | 2/2005 |
| WO | 2015048798 | A1 | 4/2015 |
| WO | 2020027499 | A1 | 2/2020 |
| WO | 2020037398 | A1 | 2/2020 |
| WO | 2021053236 | A1 | 3/2021 |
| WO | 2021253112 | A1 | 12/2021 |
| WO | 2022126252 | A1 | 6/2022 |

OTHER PUBLICATIONS

Anodic Bonding Using Gorilla Glasses. Hsu et al. Proceedings of the 12 IEEE International Conference on Nano/Micro Engineered and Molecular Systems. Apr. 9-12, 2017, Los Angeles, USA.

Dolomite Resealable Chip Interface Data Sheet, https://www.dolomite-microfluidics.com/product/resealable-chip-interface/.

High-pressure microfluidic systems (HPMS): flow and cavitation measurements in supported silicon microsystems. Thomas Gothsch et al. Microfluid Nanofluid (2015) 18:121-130. DOI 10.1007/s10404-014-1419-6.

https://gobiond.com/products/.

https://www.piedmontcmg.com.

International Search Report & Written Opinion Issued on Aug. 25, 2022 in PCT/CA2022/050860.

Micronit Microfluidics, Fluid Connect 4515, User Manual.

Samuel Marre, Andrea Adamo, Soubir Basak, Cyril Aymonier, and Klavs F. Jensen; "Design and Packaging of Microreactors for High Pressure and High Temperature Applications"; Ind. Eng. Chem. Res. 2010, 49, 11310-11320.

Shih-Chuan Liao, Jing Peng, Michael G. Mauk, Sita Awasthi, Jinzhao Song, Harvey Friedman, Haim H. Bau, and Changchun Liua, "Smart Cup: A minimally-Instrumented, Smartphone-Based Point-of-Care Molecular Diagnostic Device" Sens Actuators B Chem. Jun. 28, 2016; 229:232-238.

Xiang Cheng, Matthew D. Ooms, and David Sinton; "Biomass-to-biocrude on a chip via hydrothermal liquefaction of algae"; Lab Chip, 2016, 16, 256-260.

Ziyara et al. Optimization of hot embossing process for fabrication of microfluidic devices. In 8th Engineering and Technology Symposium, Cankaya University, Ankara May 14, 2015.

Extended European Search Report issued on Jul. 5, 2024 in European patent application No. 22814641.1.

Communication pursuant to Article 94(3) issued in European patent application No. 22814641.1 on Feb. 21, 2025.

* cited by examiner

MANIFOLDS FOR MICROFLUIDIC CHIPS, MICROFLUIDIC CHIPS, AND RELATED METHODS AND ASSEMBLIES

CROSS-REFERENCES TO RELATED APPLICATIONS

This application is a national stage entry of international patent application no. PCT/CA2022/050860 filed on May 27, 2022, which claims the benefit of and/or priority to U.S. provisional patent application No. 63/195,746 filed on Jun. 2, 2021, each of which is incorporated herein by reference in its entirety.

FIELD

This document relates to microfluidics. More specifically, this document relates to microfluidic chips, manifolds for microfluidic chips, and related methods and assemblies.

BACKGROUND

International Patent Application Publication No. WO 2020/037398 A1 (De Haas et al.) discloses a holder for a microfluidic chip that includes a base having an outward facing surface, a seat defined in the outward facing surface for receiving a microfluidic chip, and a first circular wall extending around the seat and having a first screw thread. A cover is mountable to the base over the seat for retaining the microfluidic chip on the seat. The cover has a window and a second circular wall extending around the window. The second circular wall has a second screw thread. The second screw thread is engageable with the first screw thread to screw the cover to the base with the window overlying the seat.

SUMMARY

The following summary is intended to introduce the reader to various aspects of the detailed description, but not to define or delimit any invention.

Microfluidic assemblies are disclosed. According to some aspects, a microfluidic assembly includes a microfluidic chip, a base, a cover, and a jack. The microfluidic chip has at least a first microfluidic inlet, at least a first microfluidic outlet, and at least a first microfluidic channel that is in fluid communication with the first microfluidic inlet and the first microfluidic outlet. The microfluidic chip is seated against the base. The base includes a base block and at least a first seal. The base block has at least a first fluid channel extending therethrough for delivering fluid to the microfluidic chip, and the first fluid channel has a first end that is positioned to receive the fluid from a fluid source and a second end that is positioned to deliver the fluid to the first microfluidic inlet of the microfluidic chip. The first seal is positioned to seal the second end to the first microfluidic inlet. The cover is positioned over the microfluidic chip for bearing against the microfluidic chip. At least one of the base and the cover has a viewing window that is alignable with the microfluidic chip for allowing optical access to the first microfluidic channel. The jack forces the base and the cover together to sandwich the microfluidic chip between base and the cover with the base and the cover bearing against the microfluidic chip to apply a confining pressure to the microfluidic chip and with the first seal compressed between the microfluidic chip and the base block to seal the first fluid channel in fluid communication with the first microfluidic inlet.

In some examples, the jack is a hydraulic jack. In some examples, the jack has a capacity of at least 5 tons of force.

In some examples, the jack is configured to force the base towards the cover in a linear direction while the cover is held stationary.

In some examples, the assembly further includes a frame supporting the cover and holding the cover stationary when the base is forced towards the cover. The frame can include a plate to which the jack is secured, and a support extending from the plate and supporting the cover at a fixed distance from the plate. The support can include a first post and a second post extending orthogonally from the plate in a linear direction and positioned on opposed sides of the jack.

In some examples, the base is engaged with the frame and is slidable along the frame in the linear direction when the base is forced towards the cover. The assembly can include a first slider and a second slider that are fixed to the base. The first slider and second slider can be engaged with the first post and the second post respectively, and can be slidable along the first post and second post in the linear direction when the base is forced towards the cover.

In some examples, the cover is pivotably mounted to the frame and is pivotable away from the base to allow access to the microfluidic chip.

In some examples, the assembly further includes a rounded knob fixed to the base and extending towards the jack. Motion can be transferred from the jack to the base via the rounded knob, to compensate for angle misalignment between the base and the jack. The assembly can further include a rounded seat positioned between the jack and the rounded knob, and the rounded knob can be received in the rounded seat to transfer motion from the jack to the base via the rounded seat and the rounded knob.

In some examples, the cover includes a main body having a recess facing towards the base. The cover can include the viewing window, and the viewing window can extend through the main body to the recess. A transparent panel can be seated in the recess.

In some examples, the microfluidic chip includes a silicon wafer in which the first microfluidic channel is etched and in which the first microfluidic inlet and the first microfluidic outlet are formed, and a chemically strengthened glass panel bonded to the silicon wafer to cover the microfluidic channel.

Microfluidic manifolds are also disclosed. According to some aspects, a microfluidic manifold includes a base against which a microfluidic chip is seatable, a cover, and a jack. The base includes a base block and at least a first seal. The base block has at least a first fluid channel extending therethrough for delivering fluid to the microfluidic chip, and the first fluid channel has a first end that is positioned to receive fluid from a fluid source and a second end that is positioned to deliver fluid to the microfluidic chip. The first seal is positioned to seal the second end to the microfluidic chip. The cover is positionable over the microfluidic chip for bearing against the microfluidic chip. At least one of the base and the cover has a viewing window for allowing optical access to the microfluidic chip. The jack forces the base and the cover together. When the microfluidic chip is seated against the base and the base and the cover are forced together, the microfluidic chip is sandwiched between base and the cover with the base and the cover bearing against the microfluidic chip to apply a confining pressure to the microfluidic chip, and with first seal compressed between the microfluidic chip and the base block to seal the fluid channel in fluid communication with the microfluidic chip.

Methods for operating microfluidic assemblies are also disclosed. According to some aspects, a method for operating a microfluidic assembly includes: a. seating a microfluidic chip against a base; b. with a cover positioned over the microfluidic chip, actuating a jack to force the base and the cover together to together to sandwich the microfluidic chip between the base and the cover to thereby apply a confining pressure to the microfluidic chip and seal a first fluid channel of the base in fluid communication with a first microfluidic inlet of the microfluidic channel; and c. forcing a fluid through the first fluid channel and into the first microfluidic channel.

In some examples, step b. includes actuating the jack to force the base towards the cover. Step b. can include actuating the jack to force the base to slide along a frame towards the cover.

In some examples, step b. includes actuating the jack to apply at least 5 tons of force to the base.

In some examples, step b. includes forcing the fluid into the first microfluidic channel at a pressure of at least 300 bar.

In some examples, step c. includes compressing a seal of the base against the microfluidic chip to seal the first fluid channel in fluid communication with the first microfluidic inlet.

In some examples, step b. includes transferring motion from the jack to the base via a rounded knob secured to the base and a rounded seat positioned between the base and the jack, to compensate for angle misalignment between the base and the jack.

In some examples, actuating the jack includes pumping a hydraulic fluid into a cylinder of the jack.

In some examples, the method further includes pivoting the cover away from the base to access the microfluidic chip.

Microfluidic chips are also disclosed. According to some aspects, a microfluidic chip includes a silicon wafer and a chemically strengthened glass panel. The silicon wafer has at least a first microfluidic inlet, at least a first microfluidic outlet, and at least a first microfluidic channel etched therein and in fluid communication with the first microfluidic inlet and the first microfluidic outlet. The chemically strengthened glass panel is bonded to the silicon wafer to cover the microfluidic channel.

In some examples, the chemically strengthened glass panel has opposed surfaces that are enriched with potassium ions.

In some examples, the chemically strengthened glass panel is anodically bonded to the silicon wafer.

Processes for fabricating microfluidic chips are also disclosed. According to some aspects, a process for fabricating a microfluidic chip includes: a. chemically treating a borosilicate glass panel to enrich opposed surfaces of the borosilicate glass panel with potassium ions, to yield a chemically strengthened glass panel; b. etching a microfluidic channel into a silicon wafer and providing the microfluidic channel with a microfluidic inlet and a microfluidic outlet; and c. bonding the chemically strengthened glass panel to the silicon wafer to cover the microfluidic channel.

In some examples, step a. includes immersing the borosilicate glass panel in a molten bath of potassium nitrate. Step a. can include preheating the borosilicate glass panel and then immersing the borosilicate glass panel in the molten bath of potassium nitrate. The molten bath of potassium nitrate can have a temperature of at least 400 degrees Celsius. The borosilicate glass panel can be immersed in the molten bath of potassium nitrate for at least 4 hours.

In some examples, step c. includes anodically bonding the chemically strengthened glass panel to the silicon wafer.

In some examples, step c. includes stacking the chemically strengthened glass panel and the silicon wafer to yield a stack, heating the stack, applying pressure to the stack, and applying a voltage across the stack.

In some examples, the method further includes, after step c., d. dicing the stack.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1B:
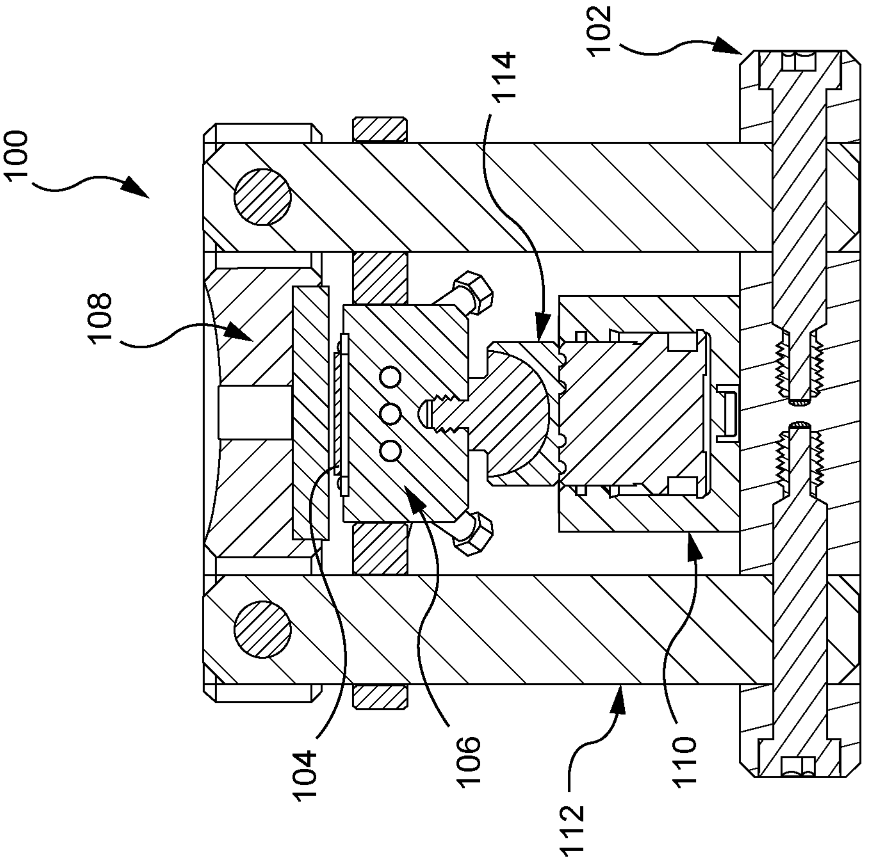
FIG. 1B is a cross-section taken vertically through the assembly of FIG. 1A, looking along line B-B.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" or "connected" or "connecting" as used herein can have several different meanings depending on the context in which these terms are used. For example, these terms can have a mechanical, fluid, electrical or communicative connotation. For further example, these terms can indicate that two or more elements or devices are directly connected to one another or connected to one another through one or more intermediate elements or devices via an electrical element, electrical signal, or a mechanical element depending on the particular context. For further example, these terms can indicate that two or more elements or devices are connected to one another such that fluid may flow between the elements or devices.

As used herein, the wording "and/or" is intended to represent an inclusive-or. That is, "X and/or Y" is intended to mean X or Y or both. As a further example, "X, Y, and/or Z" is intended to mean X or Y or Z or any combination thereof. Furthermore, the phrase "at least one of X, Y, and Z" is intended to mean X or Y or Z or any combination thereof.

Terms of degree such as "substantially", "about", and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range, including the endpoints (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Generally disclosed herein are microfluidic manifolds (also referred to as 'holders' or simply as 'manifolds') for microfluidic chips, and related methods, assemblies, and parts. The manifolds can generally serve to hold a microfluidic chip, and to direct fluid into and out of the microfluidic chip, while allowing for optical access to the microfluidic chip (e.g. for the purpose of assessing the flow of fluids through the microfluidic chip). The manifolds can generally include a jack, a base, and a cover, and can employ the jack to force the base and the cover together with a microfluidic chip sandwiched therebetween. By forcing the base and the cover together with the microfluidic chip sandwiched therebetween, the microfluidic chip is sealed to the base. Fluids can then be routed through the base and into the microfluidic chip. While the fluids are flowing through the microfluidic chip, an optical investigation can be conducted via a viewing window (e.g. in the cover), to assess the fluids.

The manifolds can in some examples be used under high pressure conditions. That is, the jack can force the base, microfluidic chip, and cover together under high pressure. This creates a high-pressure seal between the base and the microfluidic chip. Furthermore, this compresses the microfluidic chip, to apply a high confining pressure to the microfluidic chip. The high confining pressure allows for fluids to be directed into the microfluidic chip under high pressure (e.g. with fluids pressurized to greater than 300 bar, for example up to 700 bar) without bursting the microfluidic chip (or while reducing or minimizing the risk of bursting the microfluidic chip), as the confining pressure opposes the forces applied to the microfluidic chip when fluids are directed into the microfluidic chip under high pressure. The manifolds can be used in various types of microfluidic processes and to hold various types of microfluidic chips, but may be particularly useful in microfluidic research in the oil and gas industry, such as research involving the modelling of subterranean formations (e.g. oil-bearing shale formations), research involving PVT measurements of oil and/or gas samples, and/or research involving phase behavior of oil and/or gas samples, all of which can require that high pressure conditions be created in a microfluidic chip.

Further disclosed herein are microfluidic chips that are strengthened (i.e. to have a high burst strength). The strengthened microfluidic chips and the manifolds can be used together under high pressure conditions. When used together in high pressure conditions, cracking and breaking of microfluidic chips can be minimized, reduced, or avoided.

Figure 1A:
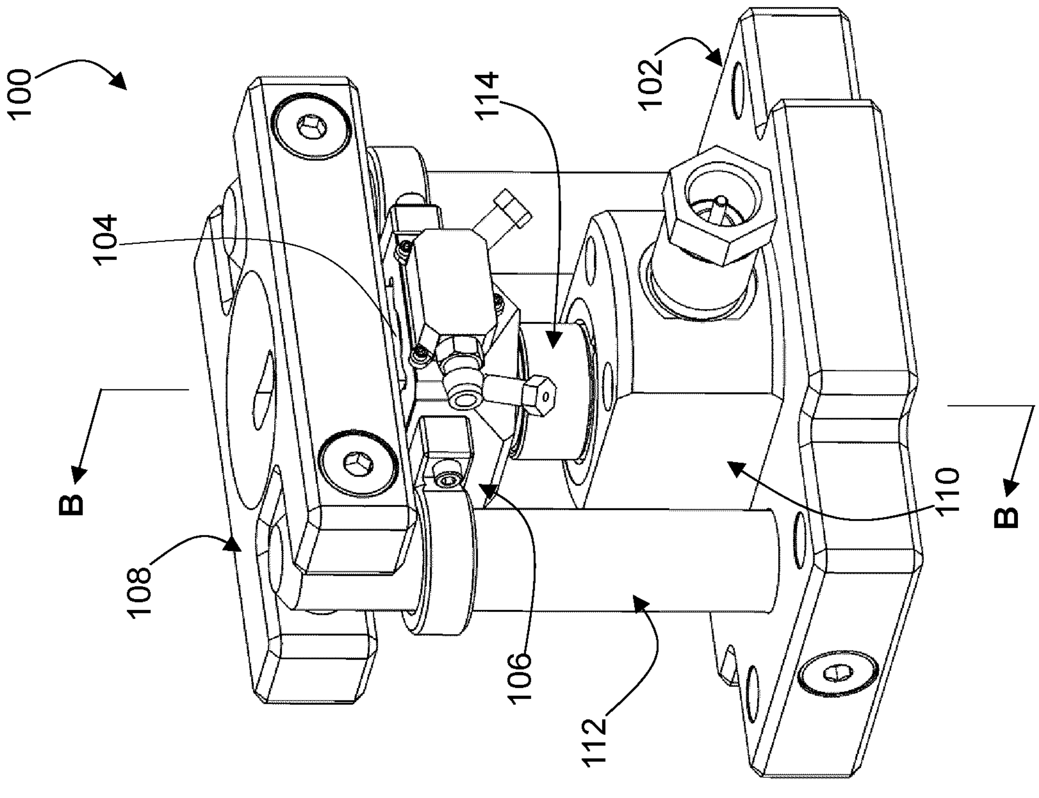
FIG. 1A is a perspective view of a first example microfluidic assembly including a microfluidic manifold and a microfluidic chip.

Referring now to FIGS. 1A and 1B, a first example of a microfluidic assembly 100 is shown. The microfluidic assembly 100 includes a manifold 102, and a microfluidic chip 104 (shown in more detail in FIGS. 2A and 2B). As will be described in greater detail below, the manifold 102 generally includes a base 106 (shown in greater detail in FIGS. 3A to 4) on which the microfluidic chip 104 is seated and through which fluids can be routed to and from the microfluidic chip 104; a cover 108 (shown in greater detail in FIGS. 5A and 5B) that is positioned over the microfluidic chip 104 and that allows for optical access to the microfluidic chip 104; a jack 110 (shown in greater detail in FIGS. 6A to 6C) for forcing the base 106 and the cover 108 together with the microfluidic chip 104 sandwiched therebetween to seal the microfluidic chip 104 to the base 106 and to apply a confining pressure to the microfluidic chip; a support assembly 112 (shown in more detail in FIG. 7) for supporting the base 106, the cover 108, and the jack 110 and for guiding the motion of the base 106; and an alignment assembly 114 (shown in more detail in FIGS. 8A and 8B) positioned between the jack 110 and the base 106 for compensating for any angle misalignment between the jack 110 and the base 106.

Figure 2A:
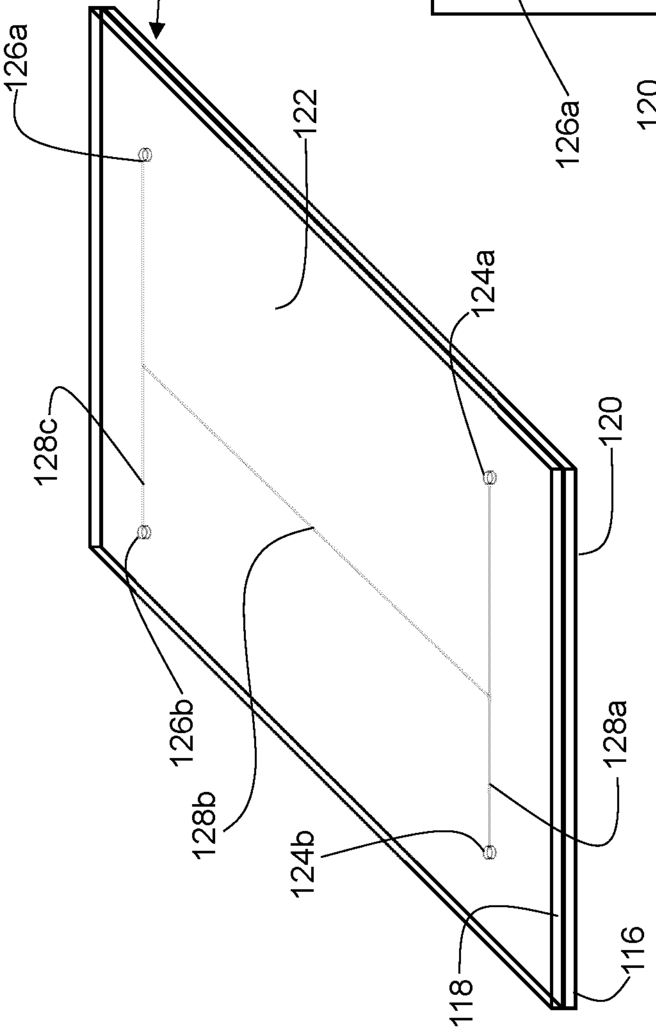
FIG. 2A is a top perspective view of the microfluidic chip of FIGS. 1A and 1B.
Figure 2B:
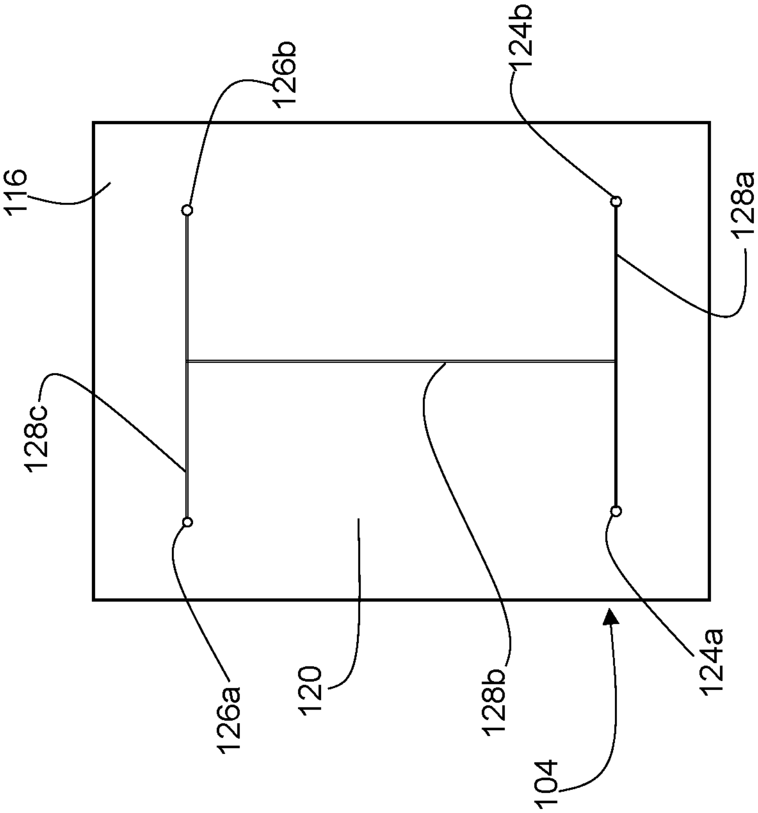
FIG. 2B is a bottom plan view of the microfluidic chip of FIG. 2A.

Various microfluidic chips are usable in the assemblies disclosed herein. Referring to FIGS. 2A and 2B, in the example shown, the microfluidic chip 104 includes a base panel 116 in which various microfluidic features (i.e. fluid channels and fluid ports, described in further detail below) are formed (e.g. by etching or drilling), and a cover panel 118 that is secured to the base panel 116 (e.g. by anodic bonding) and that covers the microfluidic features. The base panel 116 defines a first surface 120 of the microfluidic chip 104 (which in the example shown is a bottom surface), and the cover panel 118 defines a second surface 122 of the microfluidic chip 104 (which in the example shown is a top surface). In the example shown, the base panel 116 is an opaque silicon wafer, and the cover panel 118 is a transparent glass panel that is anodically bonded to the silicon wafer. The microfluidic chip 104 allows for optical investigation (e.g. imaging, optionally with the use of an optical microscope and/or video recording equipment and/or a photographic camera) of at least some of the microfluidic features.

In alternative examples, the microfluidic chip may be of another configuration. For example, both the base panel and the cover panel can be a transparent glass panel, or the base panel can be a transparent glass panel while the cover panel can be an opaque silicon wafer. For further example, one or both of the base panel and the cover panel can be a plastic panel.

Referring still to FIGS. 2A and 2B, in the example shown, the microfluidic chip 104 includes a pair of microfluidic inlets (i.e. a first microfluidic inlet 124*a* and a second microfluidic inlet 124*b*) and a pair of microfluidic outlets (i.e. a first microfluidic outlet 126*a* and a second microfluidic outlet 126*b*). The microfluidic inlets 124*a*, 124*b* and microfluidic outlets 126*a*, 126*b* are in fluid communication via a set of microfluidic channels, namely a first microfluidic channel 128*a* that extends from the first microfluidic inlet 124*a* to the second microfluidic inlet 124*b*, a second microfluidic channel 128*b* that extends from the first microfluidic channel 128*a*, and a third microfluidic channel 128*c* that is joined to the second microfluidic channel 128*b* and extends from the first microfluidic outlet 126*a* to the second microfluidic outlet 126*b*. Fluid can enter the microfluidic chip 104 via the microfluidic inlets 124*a*, 124*b*, and can then flow from first microfluidic channel 128*a* to the second microfluidic channel 128*b*, from the second microfluidic channel 128*b* to the third microfluidic channel 128*c*, and from the third microfluidic channel 128*c* to the microfluidic outlets 126*a*, 126*b*, where it can then exit the microfluidic chip 104.

The terms "microfluidic inlet" and "microfluidic outlet" are used herein for simplicity, to describe the configuration of assembly 100 as shown. It will be appreciated that the depending on the configuration of the assembly 100, fluid can enter the microfluidic chip via one or more of the microfluidic outlets 126*a*, 126*b*, and exit the microfluidic chip via one or more of the microfluidic inlets 124*a*, 124*b*.

In alternative examples, the microfluidic features can be of another configuration. For example, a microfluidic chip can include another number of microfluidic inlets (i.e. at least one microfluidic inlet), another number of microfluidic outlets (i.e. at least one microfluidic outlet), and another number of microfluidic channels that are in fluid communication with the microfluidic inlet(s) and microfluidic outlet(s) (i.e. at least one microfluidic channel). In one particular alternative example, the microfluidic chip can include a total of six microfluidic inlets/outlets.

As indicated above, the manifold 102 can be used with various microfluidic chips, of which the microfluidic chip 104 is but one example. Additional examples include the microfluidic chips described in United States Patent Application Publication No. US 2020/0215541 A1 (Abedini et al.); United States Patent Application Publication No. US 2020/0309285 A1 (Sinton et al.); U.S. Pat. No. 10,001,435 (Sinton et al.); International Patent Application Publication No. WO/2021/253112 (Ahitan et al.); and International Patent Application Publication No. PCT/CA2021/051797 (Ahitan et al.). Each of the aforementioned documents is hereby incorporated herein by reference in its entirety. Yet another example of a microfluidic chip will be described below.

The manifold 102 will now be described in greater detail, beginning with the base 106. Referring to FIGS. 3A to 3D, as described above, in use, the microfluidic chip 104 (not shown in FIGS. 3A to 3D) is seated on the base 106 and the base 106 routes fluids to and from the microfluidic chip 104. More specifically, referring to FIGS. 3A and 3B, in the example shown, the base includes a base block 130 that has a recess 132 in which the microfluidic chip 104 can be nested. The recess 132 has a recessed surface 134.

The base block 130 further includes a set of fluid channels extending therethrough, for delivering fluid to and from the microfluidic chip 104. In the example shown, the base block includes four fluid channels—i.e. a first fluid channel 136, a second fluid channel (not shown), a third fluid channel (not shown), and a fourth fluid channel (not shown). In the examples described herein, the assembly 100 is configured such that the first fluid channel 136 and second fluid channel deliver fluid to the microfluidic chip 104, and the third fluid channel and fourth fluid channel deliver fluid from the microfluidic chip 104; however, the assembly 100 can optionally be otherwise configured (e.g. with any one or more of the fluid channels serving to deliver fluid to the microfluidic chip 104, and any other one or more of the fluid channels serving to deliver fluid from the microfluidic chip 104). In alternative examples, the base block may include another number of fluid channels, such as at least two fluid channels (e.g. six fluid channels).

For simplicity, only the first fluid channel 136 is shown and described in detail. Particularly, referring to FIG. 3C, the first fluid channel 136 has a first end 138*a* and a second end 140*a*. The first end 138*a* is spaced away from the recessed surface 134, and the second end 140*a* is formed in the recessed surface 134, and is positioned to align with the first microfluidic inlet 124*a* when the microfluidic chip 104 is nested in the recess 132. In the example shown, the first end 138*a* is used as an inlet and receives fluid from a fluid source (using connectors 146 as described below), and the second end 140*a* is used as an outlet and delivers the fluid to the first microfluidic inlet 124*a* of the microfluidic chip; however the assembly 100 can optionally be configured so that the first end 138*a* is used as an outlet and the second end 140*a* is used as an inlet. For simplicity, when referencing the configuration as shown in the drawings, the first end 138*a* may also be referred to herein as a "channel inlet", and the second end 140*a* may also be referred to herein as a "channel outlet".

Figure 3C:
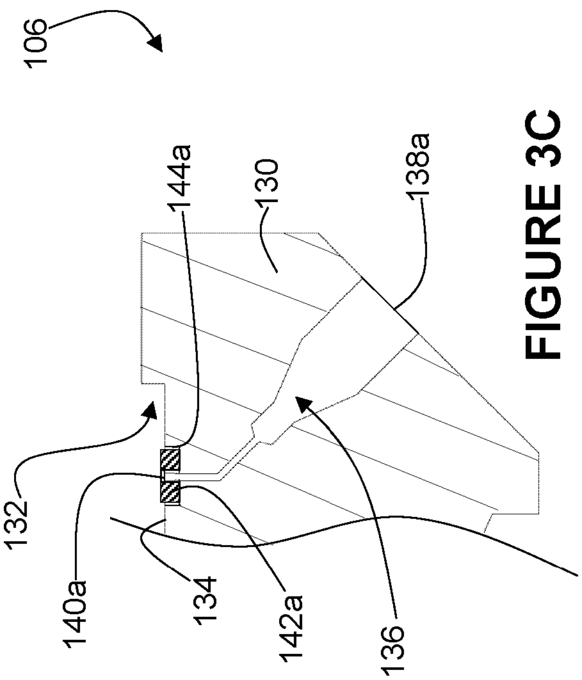
FIG. 3C is a partial cross-section taken through a fluid channel of the base of FIG. 3A.
Figure 3D:
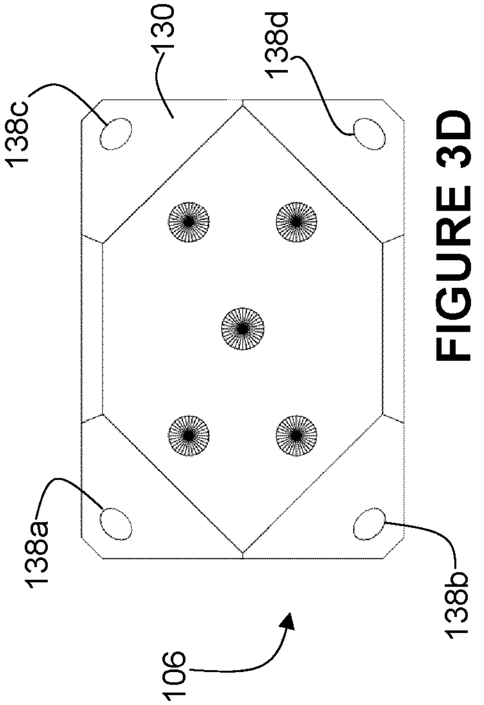
FIG. 3D is a bottom view of the base of FIG. 3A.
Figure 3A:
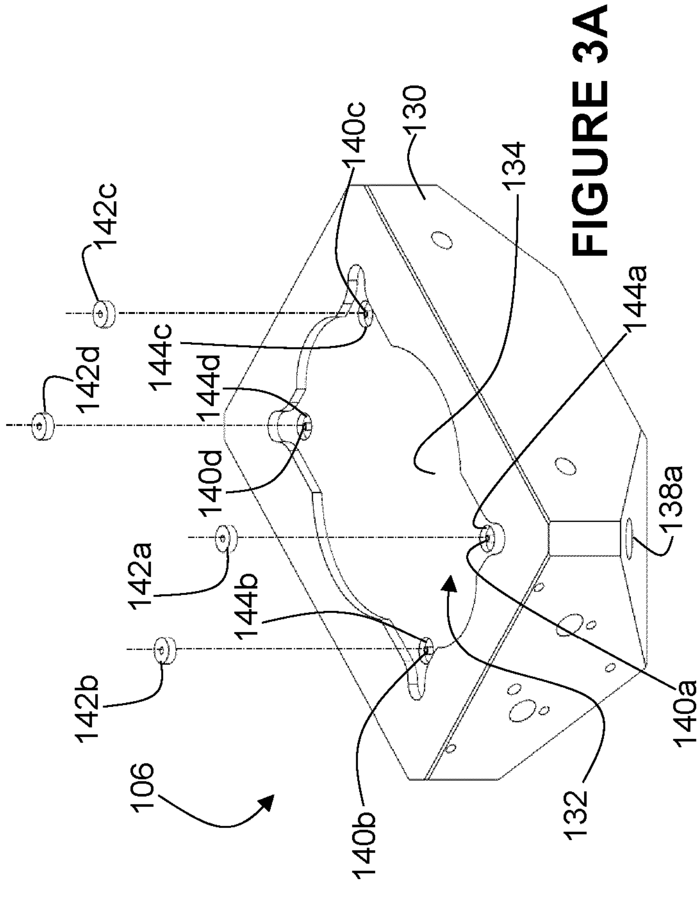
FIG. 3A is an exploded perspective view of the base of the microfluidic manifold of FIGS. 1A and 1B.
Figure 3B:
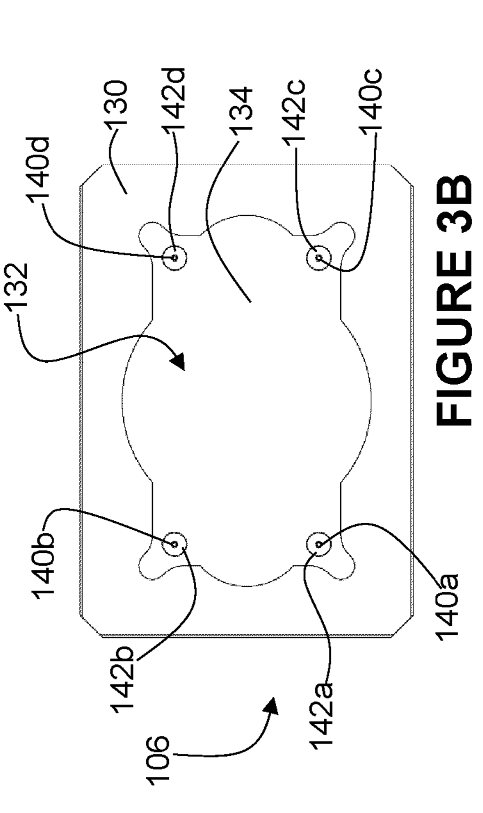
FIG. 3B is a top view of the base of FIG. 3A.

While the second through fourth fluid channels are not shown in detail, the first ends (138*b*, 138*c*, and 138*d*, respectively) and second ends (140*b*, 140*c*, and 140*d*, respectively) thereof are shown in FIGS. 3A, 3B, and 3D. The first end 138*b* (shown in FIG. 3D) of the second fluid channel is spaced away from the recessed surface 134, and the second end 140*b* (shown in FIGS. 3A and 3B) of the second fluid channel is positioned to align with the second microfluidic inlet 124*b* when the microfluidic chip 104 is nested in the recess 132. The first end 138*c* (shown in FIG. 3D) of the third fluid channel is spaced away from the recessed surface 134, and the second end 140*c* (shown in FIGS. 3A and 3B) of the third fluid channel is positioned to align with the first microfluidic outlet 126*a* when the microfluidic chip 104 is nested in the recess 132. The first end 138*d* (shown in FIG. 3D) of the fourth fluid channel is spaced away from the recessed surface 134, and the second end 140*d* (shown in FIGS. 3A and 3B) of the fourth fluid channel is positioned to align with the second microfluidic outlet 126*b* when the microfluidic chip 104 is nested in the recess 132. In the example shown, the first end 138*b* of the second fluid channel is used as an inlet and receives fluid from a fluid source (using connectors 146 as described below), and the second end 140*b* is used as an outlet and delivers the fluid to the second microfluidic inlet 124*b* of the microfluidic chip; the first end 138*c* of the third fluid channel is used as an inlet and receives fluid from the first microfluidic outlet 126*a* of the microfluidic chip 104, and the second end 140*c* of the third fluid channel is used as an outlet and delivers the fluid away from the base block 130 (e.g. to tubing via connectors 146); and the first end 138*d* of the fourth fluid channel is used as an inlet and receives fluid from the second microfluidic outlet 126*b* of the microfluidic chip 104, and the second end 140*d* of the fourth fluid channel is used as and an outlet and delivers the fluid away from the base block 130 (e.g. to tubing via connectors 146).

The base block 130 can be a solid block of, for example, titanium, and the fluid channels can be bored into the base block 130.

Referring still to FIGS. 3A to 3C, the base 106 further includes a set of seals (i.e. a first seal 142*a*, a second seal 142*b*, a third seal 142*c*, and a fourth seal 142*d*), for sealing the microfluidic chip 104 to the base block 130. That is, the first seal 142*a* is positioned to seal the second end 140*a* of the first fluid channel 136 to the first microfluidic inlet 124*a* of the microfluidic chip 104; the second seal 142*b* is positioned to seal the second end 140*b* of the second fluid channel to the second microfluidic inlet 124*b* of the microfluidic chip 104; the third seal 142*c* is positioned to seal the second end 140*c* of the third fluid channel to the first microfluidic outlet 126*a* of the microfluidic chip 104; and the fourth seal 142*d* is positioned to seal the second end 140*d* of the fourth fluid channel to the second microfluidic outlet 126*b* of the microfluidic chip 104. In the example shown, the seals 142*a-d* are in the form square profile o-rings, and the base block 130 includes a set of annular seats (i.e. a first annular seat 144*a*, a second annular seat 144*b*, a third annular seat 144*c*, and a fourth annular seat 144*d*), in which the seals 142*a*-142*d* are seated. The first annular seat 144*a* surrounds the second end 140*a* of the first fluid channel 138; the second annular seat 144*b* surrounds the second end 140*b* of the second fluid channel; the third annular seat 144*c* surrounds the second end 140*c* of the third fluid channel; and the fourth annular seat 144*d* surrounds the second end 140*d* of the fourth fluid channel.

As will be described in further detail below, when the microfluidic chip 104 is sandwiched between the base 106 and the cover 108, the microfluidic chip 104 bears against the seals 142*a-d*, and the seals 142*a-d* are compressed between the microfluidic chip 104 and the base block 130, to seal the first fluid channel 136 and second fluid channel of the base block 130 in fluid communication with the first microfluidic inlet 124*a* and second microfluidic inlet 124*b*, respectively, and to seal the third and fourth fluid channels of the base block 130 in fluid communication with the first microfluidic outlet 126*a* and second microfluidic outlet 126*b*, respectively.

In the example shown, the base block 130 includes recess 132, in which the microfluidic chip 104 is nested. In alternative examples, the recess can be omitted, and the microfluidic chip 104 can simply be positioned against a base block having a flat surface In the example above, the microfluidic chip 104 is described as being seated "on" the base 106. However, it is possible that the assembly 100 may be positioned in a different orientation from that shown in the drawings. For example, the assembly can be inverted so that the cover 108 is below the base 106. Accordingly, the microfluidic chip 104 may more generally be described as being seated "against" the base 106.

In the example shown, the seals 142*a-d* are in the form of square profile o-rings. In alternative examples, one or more of the o-rings can be of another profile (e.g. circular profile). In yet further alternative examples, instead of four separate seals, a single sheet gasket can be provided.

Figure 4:
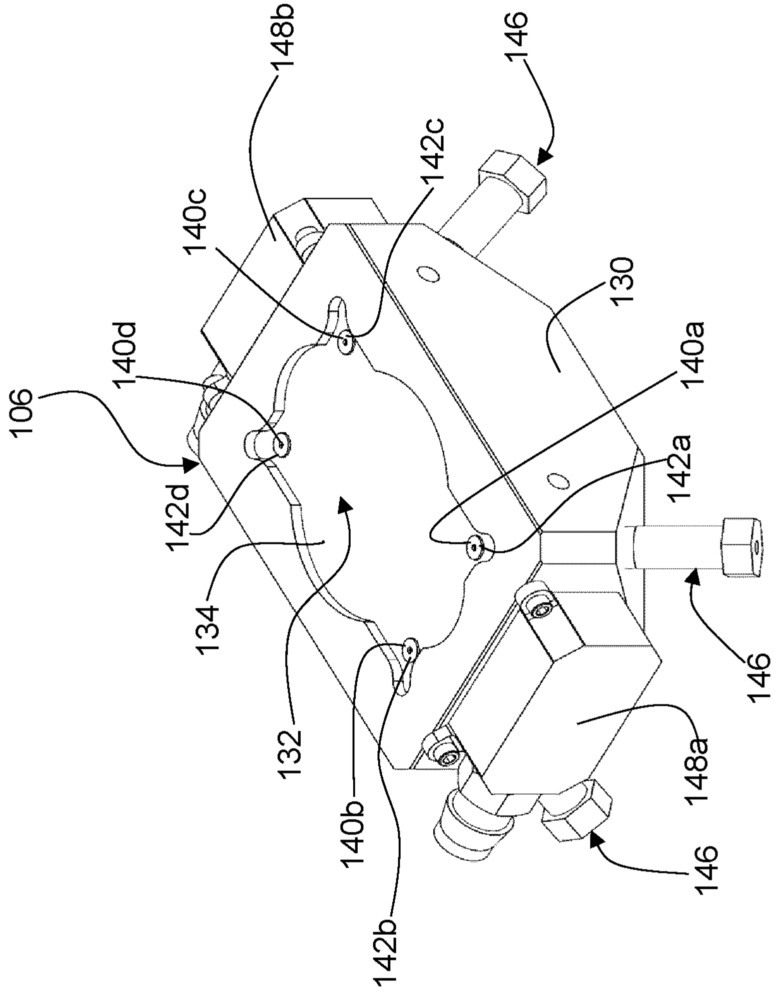
FIG. 4 is a perspective view of the base of FIG. 3A, also showing accessories mounted to the base.

Various accessories can be mounted to the base 106. Referring to FIG. 4, connectors 146 can be screwed into the first ends 138*a-d* of the fluid channels, and tubing (not shown) can be crimped to the connectors 146, so that fluid can be delivered to and/or from the fluid channels. Furthermore, in the example shown, a pair of temperature control blocks 148*a*, 148*b* are mounted to the base block 130, for controlling the temperature of the base block 130 (e.g. for heating or cooling the base block 130).

Figure 5B:
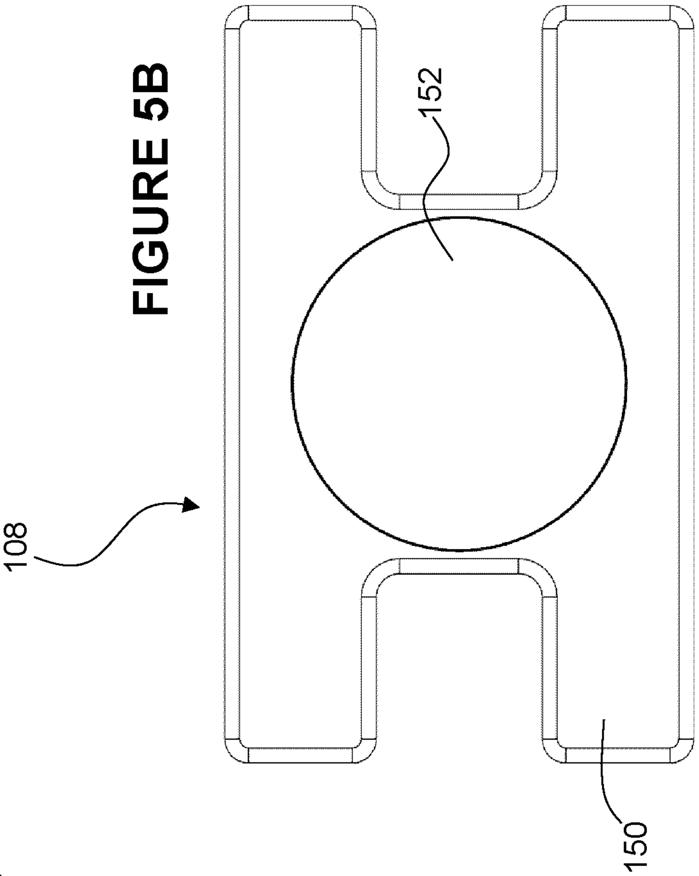
FIG. 5B is a bottom view of the cover of FIG. 5A.
Figure 5A:
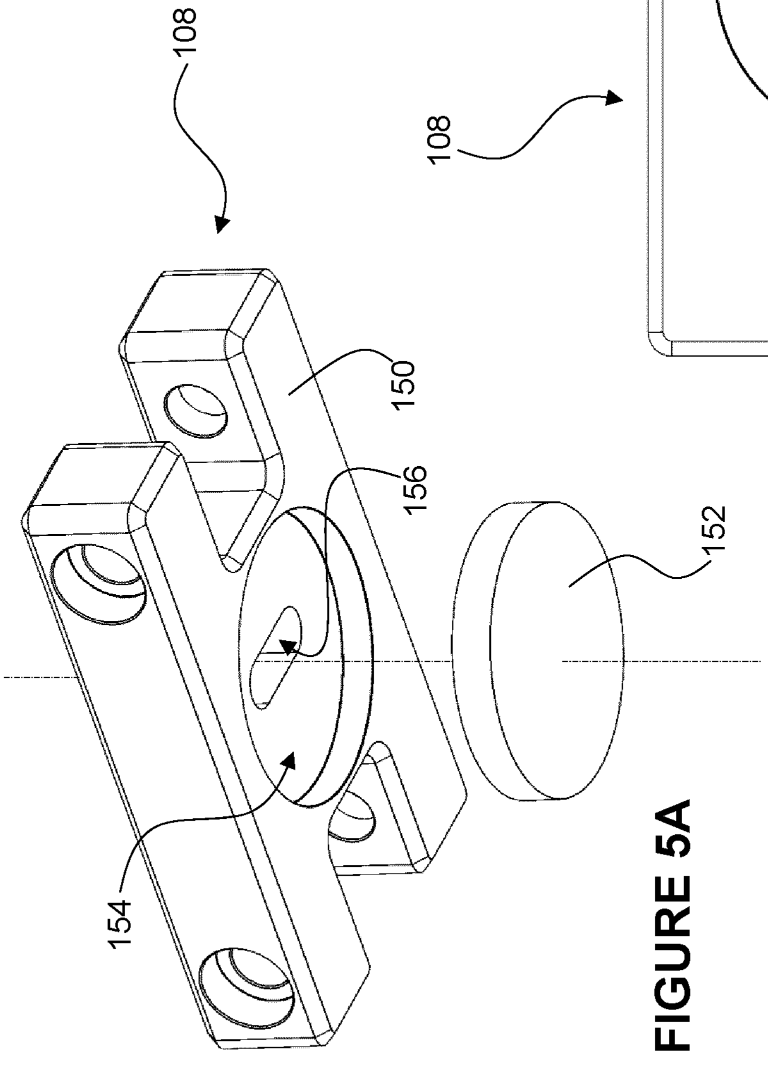
FIG. 5A is an exploded perspective view of the cover of the microfluidic manifold of FIGS. 1A and 1B.

Referring now to FIGS. 5A and 5B, the cover 108 will be described in greater detail. As noted above and as will be described in greater detail below, in use, the cover 108 bears against the microfluidic chip 104 (not shown in FIGS. 5A and 5B) to force the microfluidic chip 104 to compress the seals 142*a*-142*d* and seal to the base 106 (not shown in FIGS. 5A and 5B) and to apply a confining pressure to the microfluidic chip 104. The cover also allows for optical access to the microfluidic chip 104 (i.e. for optical access to the entire microfluidic chip 104, or to a portion of the microfluidic chip 104 such as a section of the second microfluidic channel 128*b*).

In the example shown, the cover 108 includes a main body 150, and a transparent panel 152. The main body 150 can be a solid block of, for example, titanium. The transparent panel 152 can be, for example, glass, sapphire, quartz, or plastic. The main body 150 includes a recess 154 that in use, faces towards the base 106 (not shown in FIGS. 5A and 5B), and the panel 152 is seated in the recess 154. In use, when the microfluidic chip 104 (not shown in FIGS. 5A and 5B) is sandwiched between the base 106 and the cover 108, the panel 152 bears against the microfluidic chip 104.

Referring still to FIG. 5A, the cover 108 further includes a viewing window 156 for allowing optical access to the microfluidic chip 104. In the example shown, the viewing window 156 extends vertically through the main body 150, from an upper surface of the main body 150 to the recess 154. In use, when the microfluidic chip 104 is seated on the base 106 and sandwiched between the base 106 and the cover 108, the viewing window 156 is aligned with the microfluidic chip 104, and the microfluidic chip 104 can be viewed through the viewing window 156 and through the panel 152. For example, a microscope lens can be positioned above the cover 108 (and optionally mounted to the cover 108 or another part of the manifold 102) to view the microfluidic chip 104 through the viewing window 156 and panel 152.

In the example shown, the cover 108 includes the viewing window 156. In alternative examples, a viewing window can be positioned elsewhere, such as in the base.

Figure 6B:
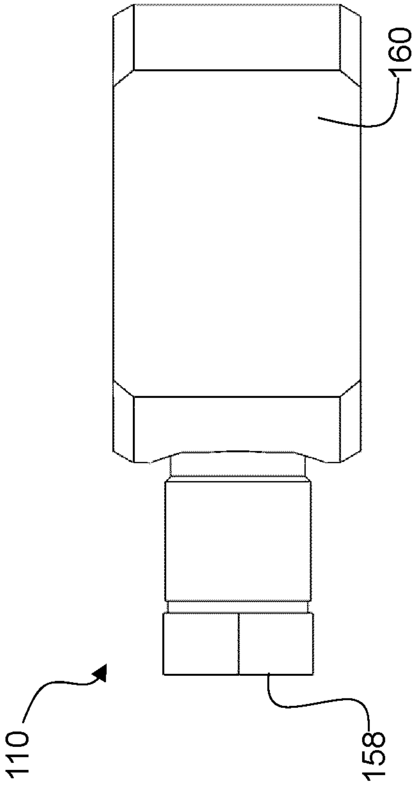
FIG. 6B is a side view of the jack of FIG. 6A, showing a piston thereof in a lowered position.
Figure 6C:
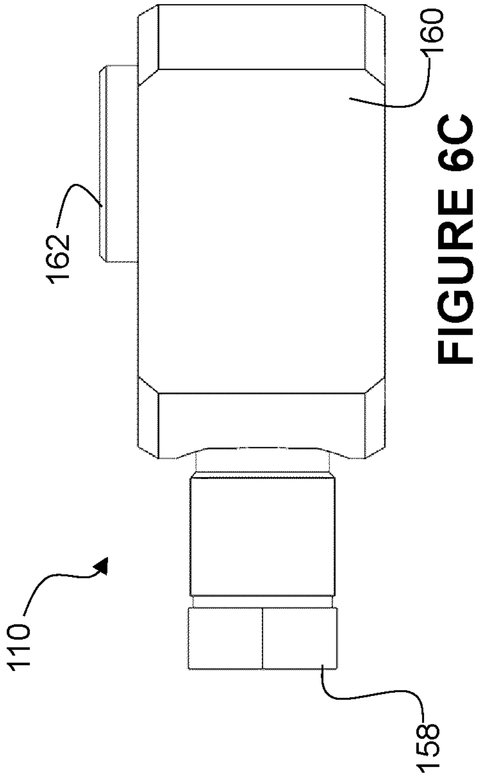
FIG. 6C is a side view of the jack of FIG. 6A, showing a piston thereof in a raised position.
Figure 6A:
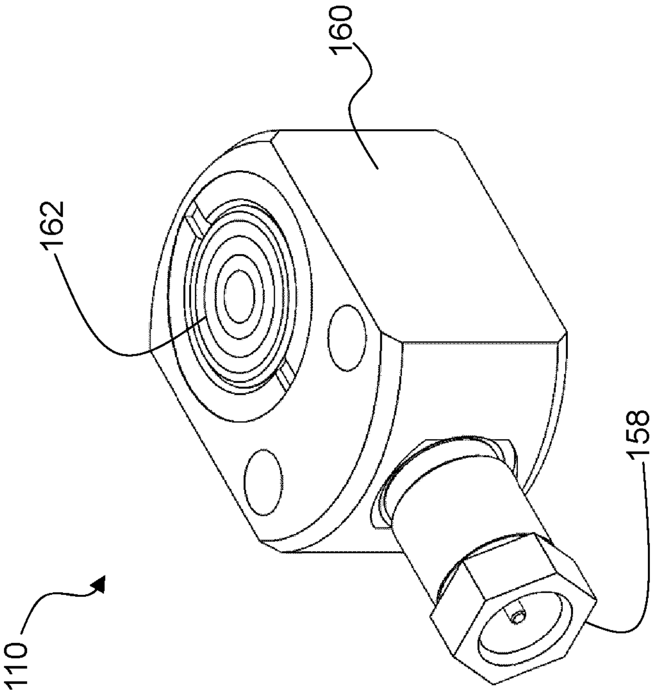
FIG. 6A is a perspective view of the jack of the microfluidic manifold of FIGS. 1A and 1B.

Referring now to FIGS. 6A to 6C, the jack 110 will be described in greater detail. As mentioned above and as will be described in greater detail below, in use, the jack 110 forces the base 106 (not shown in FIGS. 6A to 6C) and the cover 108 (not shown in FIGS. 6A to 6C) together, to sandwich the microfluidic chip 104 (not shown in FIGS. 6A to 6C) between the base 106 and the cover 108. More specifically, as will be described in greater detail below, in the example shown the jack 110 forces the base 106 towards the cover 108 in a linear direction (i.e. vertically, in the example shown), while the cover 108 is held stationary.

As used herein, the term "jack" can refer to any apparatus that forces displacement (e.g. horizontal or vertical displacement) of another element. For example, the term "jack" can refer to a hydraulic jack, a pneumatic jack, a screw jack, a scissor jack, or another type of jack.

Referring still to FIGS. 6A to 6C, in the example shown, the jack 110 is a hydraulic jack. For example, the jack 110 can be a commercially available hydraulic jack sold by Enerpac Tool Group (Wisconsin, US). As such jacks are commercially available, they are not described in detail herein. However, briefly, in the example shown, the jack 110 includes a fluid inlet/outlet 158, a cylinder 160, and a piston 162 that is vertically movable within the cylinder 160 by the flow of a hydraulic fluid into the cylinder 160 via the fluid inlet/outlet 158. In FIG. 6B, the jack 110 is shown with the piston 162 (not visible) in a lowered position (i.e. the position when hydraulic fluid is pumped out of the cylinder 160), and in FIG. 6C, the piston 162 is shown in a raised position (i.e. the position when hydraulic fluid is pumped into the cylinder 160). The stroke length of the jack 110 can be, for example, between about 0.06 inches and about 2.0 inches; however in typical use, the jack 110 can be engaged to move the piston about 0.25 inches. The jack 110 can have a capacity of, for example, at least about 5 tons (e.g. about 5 tons or about 10 tons or about 20 tons).

Figure 7:
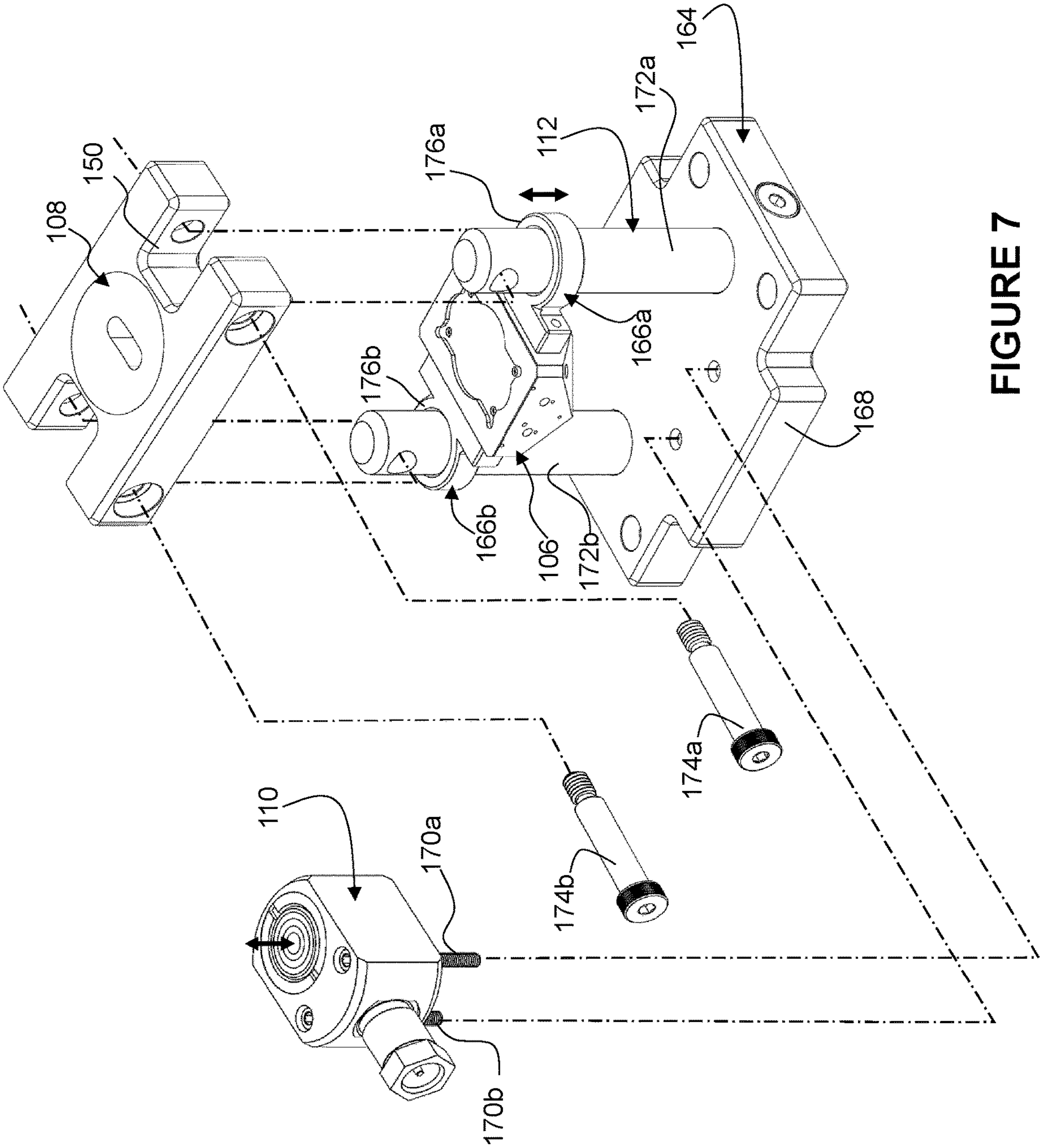
FIG. 7 is an exploded perspective view of the support assembly, cover, base, and jack of the microfluidic manifold of FIGS. 1A and 1B.

Referring now to FIG. 7, the support assembly 112 will be described in greater detail. In FIG. 7, for clarity, the base 106, cover 108, and jack 110 are shown together with the support assembly 112. As mentioned above and as will be described in further detail below, the support assembly 112 supports the base 106, the cover 108, and the jack 110, allows for the jack 110 to transfer motion to the base 106 while holding the cover 108 stationary, and guides the motion of the base 106 (i.e. limits the motion of the base 106 to vertical motion).

In the example shown, the support assembly 112 includes a frame 164, and a pair of sliders (i.e. a first slider 166*a* and a second slider 166*b*). The frame 164 supports the cover 108 and holds the cover 108 stationary while the base 106 is forced towards the cover 108, and the sliders 166*a-b* are mounted to the base 106 and slide along the frame 164 to guide the motion of the base 106.

More specifically, in the example shown, the frame 164 includes a plate 168. The jack 110 is positioned on the plate 168 and is secured to the plate 168 by a pair of bolts 170*a*, 170*b*. A pair of posts (i.e. a first post 172*a* and a second post 172*b*) are positioned on opposed sides of the jack 110, and extend orthogonally from the plate 168 in a linear direction (i.e. vertically, in the example shown). The posts 172*a-b* support the cover 108 at a fixed distance from the plate 168. That is, the lower ends of the posts 172*a-b* are secured to the plate 168, and the main body 150 of the cover 108 is secured to the upper ends of the posts 172*a-b* by a pair of bolts 174*a*, 174*b*.

Referring still to FIG. 7, the base 106 is engaged with the frame 164 and is slidable along the frame 164 in a linear direction (i.e. vertically, in the example shown) when the base 106 is forced towards and away from the cover 108, to guide the motion of the base 106 (i.e. to limit the motion of the base to vertical motion). More specifically, in the example shown, the first slider 166*a* and second slider 166*b* are fixed to the base 106 on opposed sides of the base 106. Each slider 166*a-b* includes a respective ring that is engaged with one of the posts 172*a-b*—i.e. the first post 172*a* is received in a ring 176*a* of the first slider 166*a*, and the second 172*b* post is received in a ring 176*b* of the second slider 166*b*. The rings 176-*b* are slidable along the posts 172*a-b* in a linear direction (i.e. vertically, in the example shown) when the base 106 is forced towards and away from the cover 108, to guide the motion of the base 106.

Figure 8B:
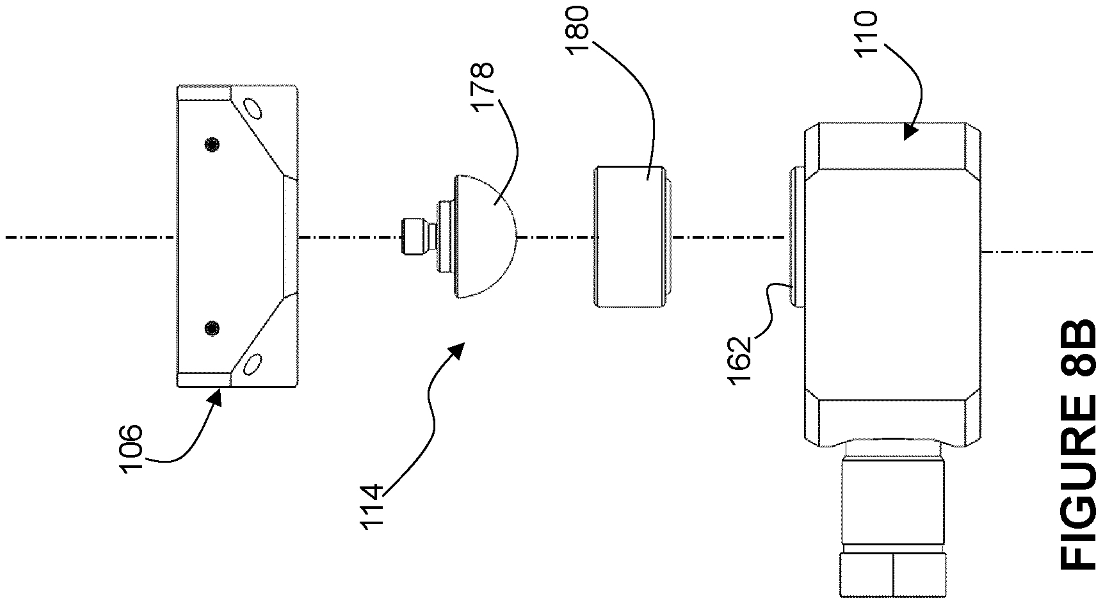
FIG. 8B is an exploded side view of the alignment assembly, jack, and base of the microfluidic manifold of FIG. 8A.
Figure 8A:
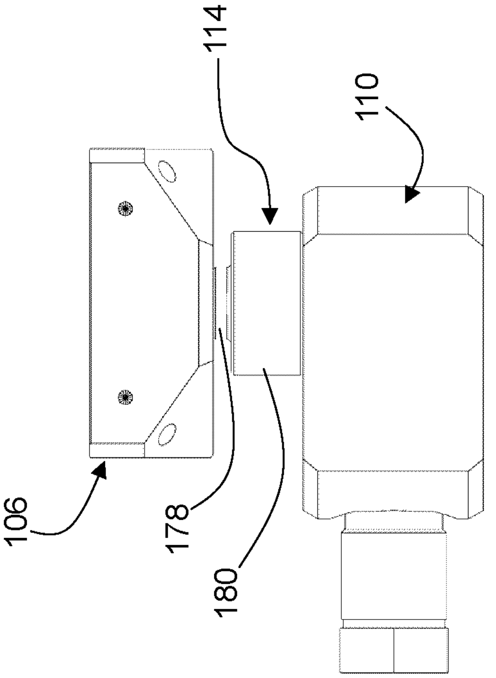
FIG. 8A is a side view of the alignment assembly, jack, and base of the microfluidic manifold of FIGS. 1A and 1B.

Referring now to FIGS. 8A and 8B, the alignment assembly 114 will be described in greater detail. In FIGS. 8A and 8B, for clarity, the base 106 and jack 110 are shown together with the alignment assembly 114. As mentioned above and as will be described in further detail below, the alignment assembly 114 is positioned between the jack 110 and the base 106 for compensating for any angle misalignment between the jack 110 and the base 106.

In the example shown, the alignment assembly 114 includes a rounded knob 178 and a rounded seat 180. The rounded knob 178 is fixed to the base 106 on the bottom surface of the base 106, and extends downwardly towards the jack 110. The rounded seat 180 is positioned between the jack 110 and the rounded knob 178, and is seated on the piston 162. In use, the rounded knob 178 is received in the rounded seat 180, and motion is transferred from the jack 110 to the base 106 via the rounded seat 180 and rounded knob 178. That is, motion is transferred from the piston 162 to the rounded seat 180, from the rounded seat 180 to the rounded knob 178, and from the rounded knob 178 to the base 106. In use, if the piston 162 and the base 106 are angularly misaligned (i.e. if the contact surfaces thereof are not substantially parallel), the alignment assembly 114 compensates for this misalignment.

Figure 9B:
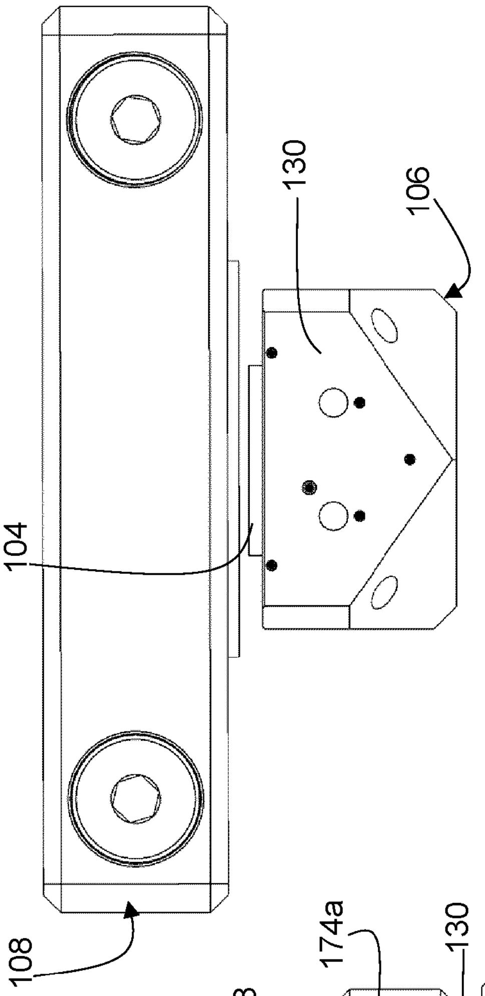
FIG. 9B is an enlarged front view of the base, microfluidic chip, and cover of the microfluidic assembly of FIG. 9A, when the assembly is in the starting position.
Figure 9C:
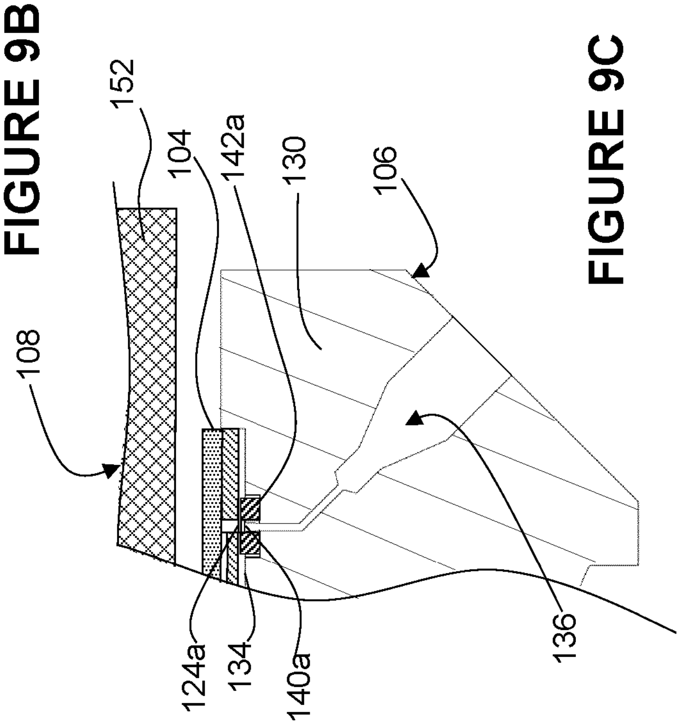
FIG. 9C is a partial cross section taken through the base, microfluidic chip, and cover of the microfluidic assembly of FIG. 9A, when the assembly is in the starting position.
Figure 9A:
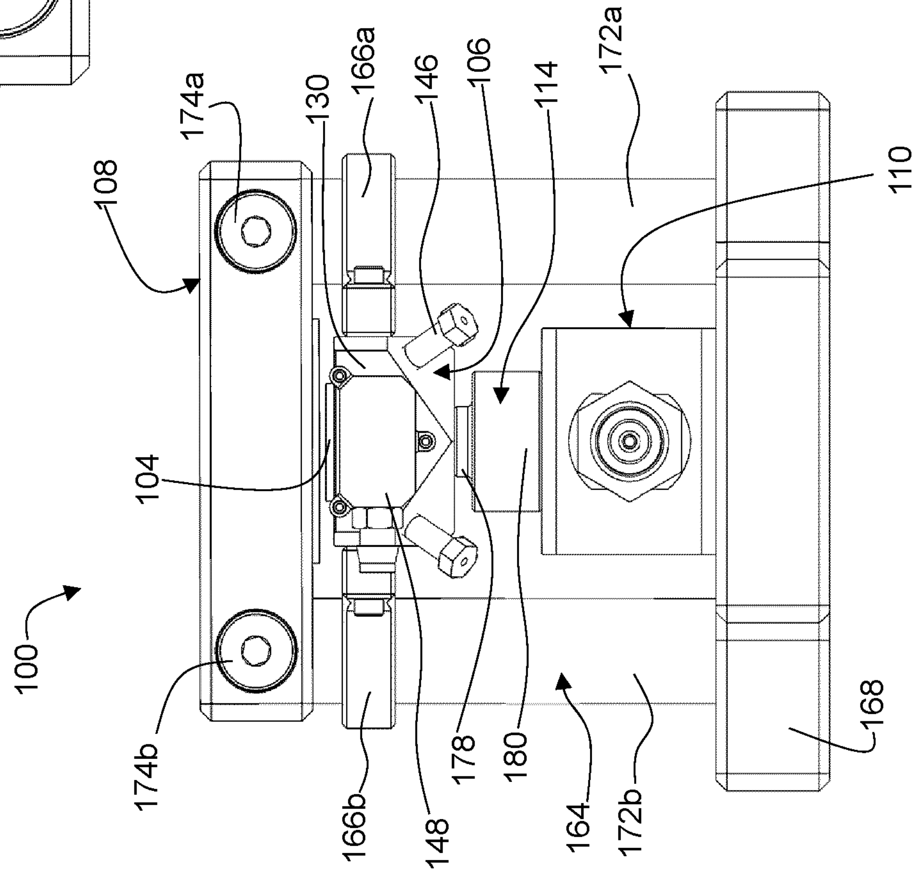
FIG. 9A is a front view of the microfluidic assembly of FIG. 1A, showing the assembly in a starting position.

Referring now to FIGS. 9A to 10C, an example of the operation of the assembly 100 as a whole will be described. In FIGS. 9A to 9C, the assembly 100 is shown in a starting position—i.e. with the base 106 and microfluidic chip 104 spaced apart from the cover 108, so that the microfluidic chip 104 is not sealed to the base 106 and is not subject to a confining pressure. In FIG. 9A, the assembly 100 in its entirety is shown in the starting position; in FIG. 9B, the microfluidic chip 104, the base 106, and the cover 108 are shown in isolation, when the assembly 100 is in the starting position; and in FIG. 9C, a partial cross section of the microfluidic chip 104, base 106, and cover 108 is shown, when the assembly 100 is in the starting position. In contrast, in FIGS. 10A to 10C, the assembly 100 is shown in an in-use position, with the microfluidic chip 104 sandwiched between the base 106 and the cover 108, so that it is sealed to the base 106 and is subject to a confining pressure. In FIG. 10A, the assembly 100 in its entirety is shown in the in-use position; in FIG. 10B, the microfluidic chip 104, the base 106, and the cover 108 and are shown in isolation, when the assembly 100 is the in-use position; and in FIG. 10C, a partial cross section of the microfluidic chip 104, the base 106, and the cover 108 is shown, when the assembly 100 is in the in-use position.

At the start of the method, the assembly 100 can be configured in the starting position, as shown in FIG. 9A—i.e. with the jack 110 secured to the plate 168 and with the piston 162 (not visible in FIG. 9A) in the lowered position; with the rounded seat 180 of the alignment assembly 114 seated on the piston 162; with the sliders 166*a-b* fixed to the base 106 and engaged with the posts 172*a-b*; with the rounded knob 178 of the alignment assembly 114 fixed to the base block 130 and resting in the rounded seat 180; with the connectors 146 (only one of which is labelled) screwed into the base block 130 and connected to tubing (not shown); with the temperature control blocks 148*a-b* fixed to the base block 130; with the microfluidic chip 104 seated against the base 106 so that the microfluidic chip 104 is nested in the recess 132 (not visible in FIGS. 9A) and resting on the seals 142*a-d* (not visible in FIG. 9A); and with the cover 108 positioned over the base 106 and microfluidic chip 104 and secured to the posts 172*a-b* by bolts 174*a-b*.

Referring to FIG. 9B, when the assembly 100 is in this configuration—i.e. when the piston 162 (not shown in FIG. 9B) is lowered—the microfluidic chip 104 is spaced apart from the cover 108. Accordingly, although not visible in FIG. 9B, while the microfluidic inlets 124*a-b* and microfluidic outlets 126*a-b* of the microfluidic chip 104 are aligned with the second ends 140*a*-140*d* of the fluid channels, the seals 142*a-d* are not sufficiently compressed between the microfluidic chip 104 and the base 106 to seal the microfluidic chip 104 to the base 106. This can be seen in FIG. 9C, where the first microfluidic inlet 124*a* is aligned with the second end 140*a* of the first fluid channel 136, but the microfluidic chip 104 is not applying sufficient force to the base 106 to compress the seal 142*a* and seal the first microfluidic inlet 124*a* to the second end 140*a*. Furthermore, the microfluidic chip 104 is not subject to a confining pressure.

Optionally, in order to configure the assembly 100 in the starting position, the cover 108 can initially be removed from the frame 164 (by removing bolts 174*a-b*), so that the microfluidic chip 104 can be placed on the base 106. Alternatively, only one of the bolts 174*a-b* can be removed, and the cover 108 can be pivoted away from the base 106, using the remaining bolt as a hinge.

Figure 10B:
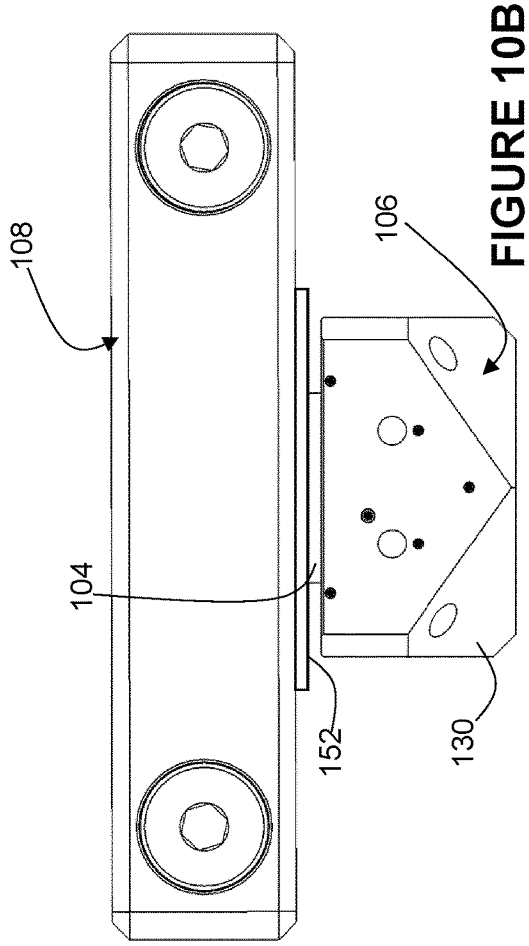
FIG. 10B is an enlarged front view of the base, microfluidic chip, and cover of the microfluidic assembly of FIG. 10A, when the assembly is in the in-use position.
Figure 10C:
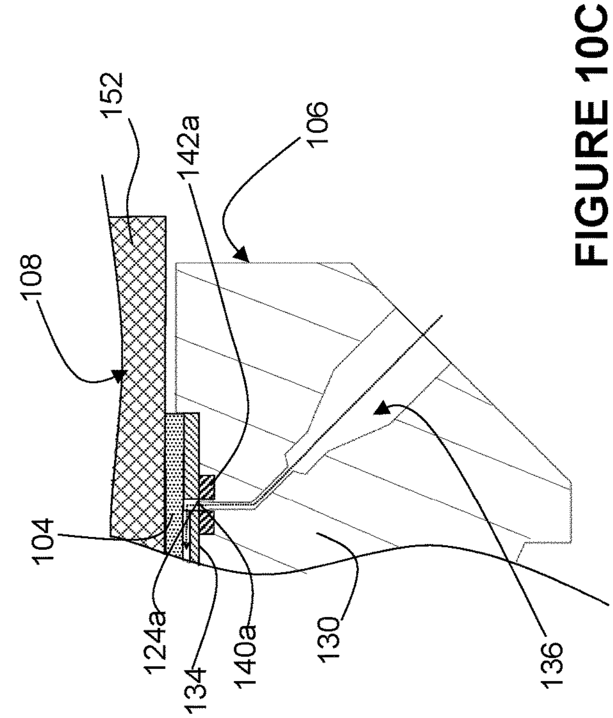
FIG. 10C is a partial cross section taken through the base, microfluidic chip, and cover of the microfluidic assembly of FIG. 10A, when the assembly is in the in-use position.
Figure 10A:
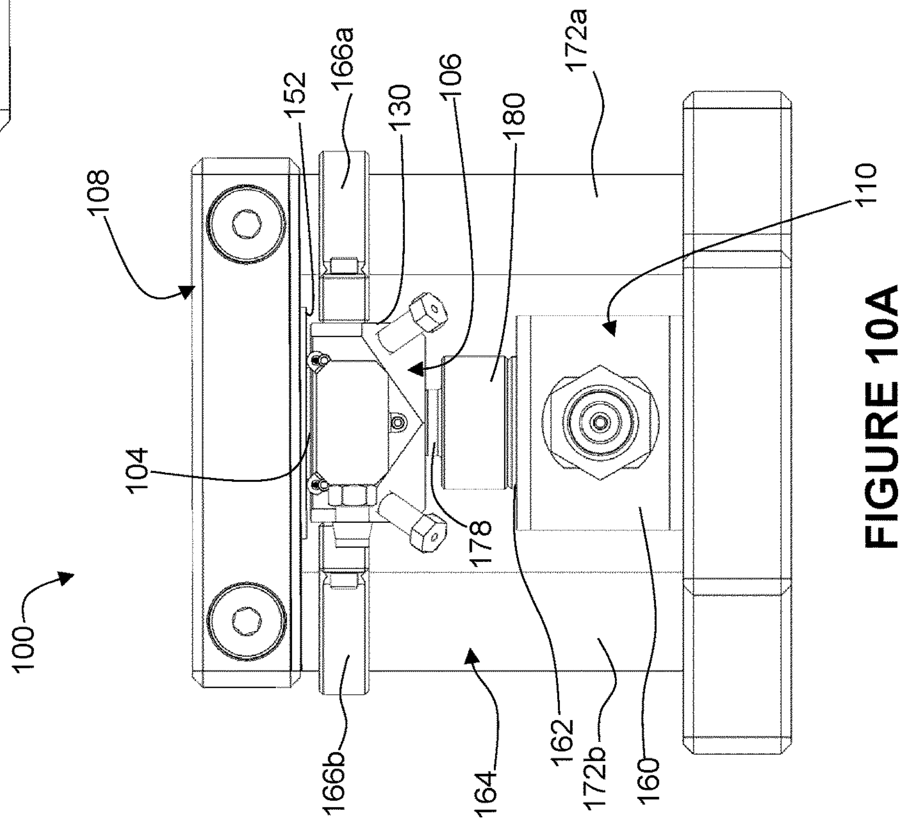
FIG. 10A is a front view of the microfluidic assembly of FIG. 1A, showing the assembly in an in-use position.

Referring now to FIG. 10A, to move the assembly 100 from the starting position to the in use position, the jack 110 can be actuated, by pumping a hydraulic fluid into the cylinder 160 to force the piston 162 to move linearly outwardly from the cylinder 160 (i.e. vertically upwardly, in the example shown). Motion is transferred from the piston 162 to the rounded seat 180, from the rounded seat 180 to the rounded knob 178, and from the rounded knob to the base 106. The base 106 is then forced towards the cover 108, by sliding along the frame 164 towards the cover 108 (i.e. with the sliders 166*a-b* sliding along the posts 172*a-b* to guide the motion of the base 106).

Referring to FIG. 10B, the base 106 can be forced upwardly until the microfluidic chip 104 contacts the transparent panel 152 of the cover 108 and is sandwiched between the base 106 and the cover 108 to apply a confining pressure to the microfluidic chip 104, and with the microfluidic chip 104 bearing against the seals 142*a-d* (not shown in FIG. 10B) to compress the seals 142*a-d* between the microfluidic chip 104 and the base block 130 and seal the microfluidic chip 104 to the base 106. This can be seen in FIG. 10C, where the microfluidic chip 104 is compressed between the transparent panel 152 and the recessed surface 134 to apply a confining pressure to the microfluidic chip 104, and where the first microfluidic inlet 124*a* is aligned with the second end 140*a* of the first fluid channel 136 and the microfluidic chip 104 is applying sufficient force to compress the seal 142*a* and seal the first microfluidic inlet 124*a* to the second end 140*a*. Accordingly, in the in use position, the second end 140*a* of the first fluid channel 136 is sealed to the first microfluidic inlet 124*a* of the microfluidic chip 104, the second end 140*b* (not shown in FIGS. 10A to 10C) of the second fluid channel is sealed to the second microfluidic inlet 124*b* (not shown in FIGS. 10A to 10C) of the microfluidic chip 104, the second end 140*c* (not shown in FIGS. 10A to 10C) of the third fluid channel is sealed to the first microfluidic outlet 126*a* (not shown in FIGS. 10A to 10C) of the microfluidic chip 104, and the second end 140*d* (not shown in FIGS. 10A to 10C) of the fourth fluid channel is sealed to the second microfluidic outlet 126*b* of the microfluidic chip 104.

While still actuating the jack 110 to sandwich the microfluidic chip 104 between the base 106 and the cover 108 (i.e. to maintain the confining pressure and maintain the seal between the microfluidic chip 104 and the base 106), a fluid can be forced into and through the microfluidic chip 104 via the base 106. More specifically, a fluid can be directed from a fluid source (e.g. a syringe pump, not shown) into the first fluid channel 136 and second fluid channel of the base block 130, for example via tubing (not shown) connected between the fluid source and the connectors 146. The fluid can then flow through the first fluid channel 136 and second fluid channel and into the first microfluidic inlet 124*a* and second microfluidic inlet 124*b*, respectively. The fluid can then flow into and through the microfluidic channels 128*a-c*, and from the microfluidic channels 128*a-c* to the microfluidic outlets 126*a-b*. The fluid can then flow into the third and fourth fluid channels of the base block 130. From the third and fourth fluid channels, the fluid can exit the base 106 (e.g. the fluid can flow into additional tubing towards another syringe pump, not shown).

While the fluid is flowing through the microfluidic chip 104, an optical analysis can be conducted, for example to study the flow properties of the fluid. For example, the microfluidic channel(s) 128*a-c* (or a portion thereof) can be viewed via the viewing window 156 and transparent panel 152, with the use of a microscope, and/or one or more cameras, to study the properties of the fluid.

Due to the force applied by the jack 110, a high confining pressure is applied to the microfluidic chip 104 and a high pressure seal is formed between the microfluidic chip 104 and the base 106, and thus the fluid can be forced through the microfluidic chip 104 at high pressure without bursting the microfluidic chip 104 (or while reducing or minimizing the risk of bursting the microfluidic chip 104). For example, the jack 110 can apply least about 5 tons (e.g. about 5 tons or about 10 tons or about 20 tons) of force to the base 106, and the fluid pressure can in turn be at least about 300 bar, or at least about 350 bar, or up to about 700 bar. This can allow for the assembly 100 to mimic the pressure conditions in subterranean formations (e.g. oil-bearing shale formations), which can in turn allow for the assembly 100 to be used in the study of fluids used in subterranean formations (e.g. for PVT studies or phase behavior studies of such fluids).

Figure 11B:
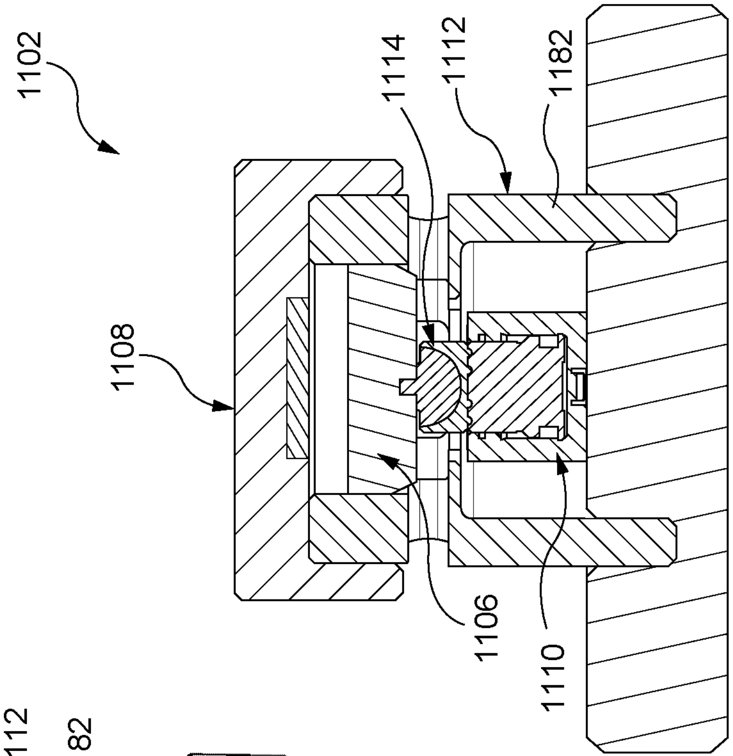
FIG. 11B is a cross-section taken vertically through the assembly of FIG. 11A, looking along line B-B.
Figure 11A:
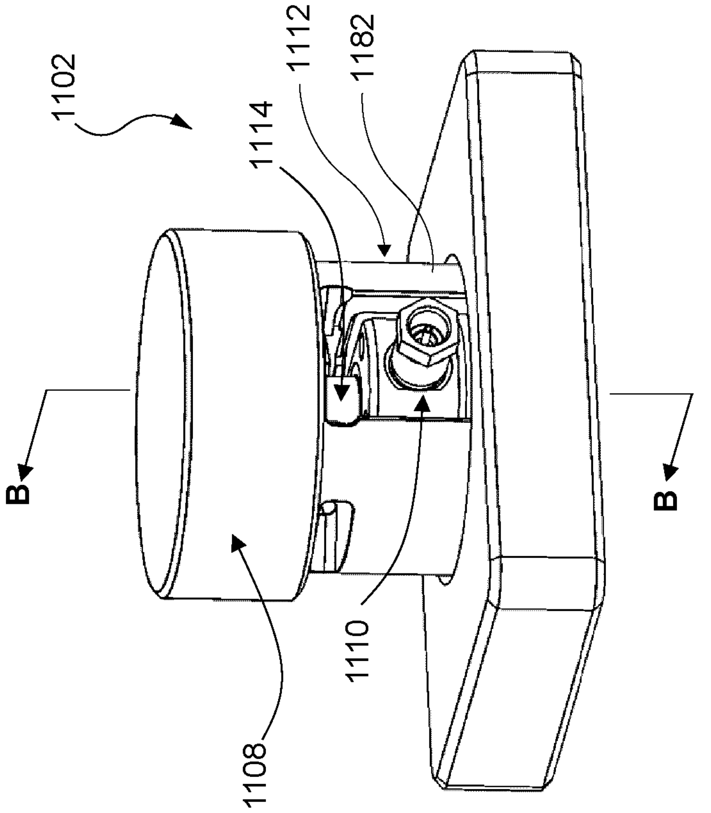
FIG. 11A is a perspective view of a second example microfluidic assembly including a microfluidic manifold and a microfluidic chip.

Referring now to FIGS. 11A and 11B, another example of a manifold is shown. The manifold 1102 is similar to the manifold 102 of FIGS. 1 and 3 to 10, and features in FIGS. 11A and 11B that are like those of FIGS. 1 and 3 to 10 will be identified with like reference numerals, incremented by 1000.

Similarly to the manifold 102, the manifold 1102 generally includes a base 1106 (visible in FIG. 11B) on which a microfluidic chip (not shown) can be seated and through which fluids can be routed to and from the microfluidic chip; a cover 1108 that is positionable over the microfluidic chip and that allows optical access to the microfluidic chip; a jack 1110 for forcing the base 1106 and the cover 1108 together with the microfluidic chip sandwiched therebetween to apply a confining pressure to the microfluidic chip 104 and seal the microfluidic chip to the base 1106; a support assembly 1112 for supporting the base 1106, the cover 1108, and the jack 1110 and for guiding the motion of the base 1106 while holding the cover 1108 stationary; an alignment assembly 1114 positioned between the jack 1110 and the base 1106 for compensating for any angle misalignment between the jack 1110 and the base 1106; and a temperature control block (not shown) for controlling the temperature of the base 1106.

Unlike the manifold 102, in the manifold 1102, the support assembly 1112 includes a cylindrical housing 1182, instead of posts 172*a-b*. The jack 1110, the alignment assembly 1114, and the base 1106 are positioned within the cylindrical housing 1182, and the cylindrical housing 1182 includes gaps that provide access to the components housed therein, and allows for tubing (not shown) to reach the base 1106. The cover 1108 is also cylindrical, and is screwed directly to the cylindrical housing 1182 (via screw threads, not shown, on an outer surface of the cylindrical housing 1182, and screw threads, not shown, on an inner surface of the cover 1108). In use, when the jack 1110 is actuated, the jack 1110 forces the base 1106 to slide towards the cover 1108 (i.e. vertically upwardly) within the cylindrical housing 1182, with the cylindrical housing 1182 guiding the motion of the base 1106 and holding the cover 1108 stationary.

Figure 12B:
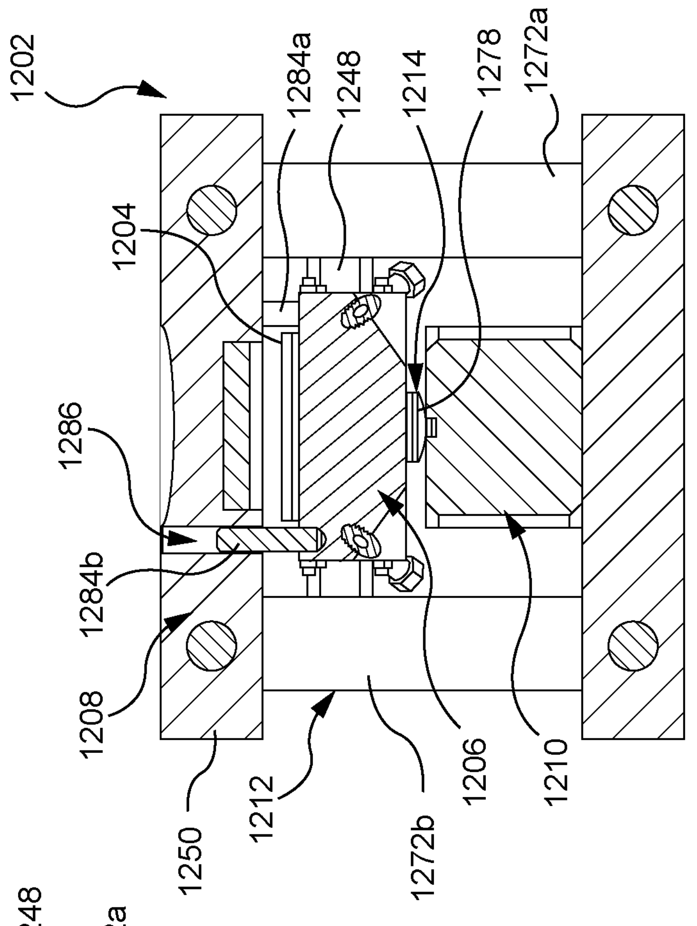
FIG. 12B is a cross-section taken vertically through the assembly of FIG. 12A, looking along line B-B.
Figure 12A:
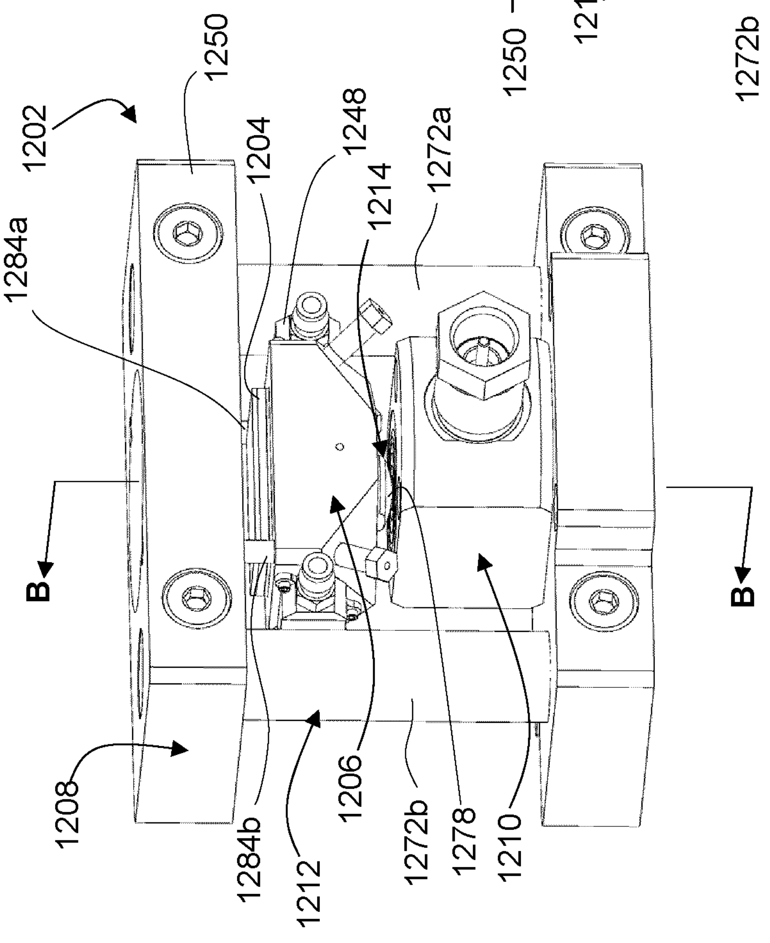
FIG. 12A is a perspective view of a third example microfluidic assembly including a microfluidic manifold and a microfluidic chip.

Referring now to FIGS. 12A and 12B, another example of a manifold is shown. The manifold 1202 is similar to the manifold 102 of FIGS. 1 and 3 to 10, and features in FIGS. 12A and 12B that are like those of FIGS. 1 and 3 to 10 will be identified with like reference numerals, incremented by 1100.

Similarly to the manifold 102, the manifold 1202 generally includes a base 1206 on which a microfluidic chip 1204 can be seated and through which fluids can be routed to and from the microfluidic chip 1204; a cover 1208 that is positioned over the microfluidic chip 1204 and that allows optical access to the microfluidic chip 1204; a jack 1210 for forcing the base 1206 and the cover 1208 together with the microfluidic chip 1204 sandwiched therebetween to apply a confining pressure to the microfluidic chip 104 and seal the microfluidic chip 1204 to the base 1206; a support assembly 1212 for supporting the base 1206, the cover 1208, and the jack 1210; an alignment assembly 1214 positioned between the jack 1210 and the base 1206 for compensating for any angle misalignment between the jack 1210 and the base 1206; and temperature control blocks 1248 (only one of which is labelled) for controlling the temperature of the base 1206.

Unlike the manifold 102, the manifold 1202 does not include sliders for sliding along the posts 1272*a-b* of the support assembly 1212; rather pins 1284*a-b* are fixed to the base 1206 and extend upwardly towards the cover 1208. The pins 1284*a-b* are received in holes 1286 (only one of which is visible, and visible only in FIG. 12B) of the main body 1250 of the cover 1206, and are slidable within the holes 1286. In use, when the jack 1210 is actuated, the jack 1210 forces the base 1206 to slide towards the cover 1208 (i.e. vertically upwardly), and the pins 1284 slide within the holes 1286, to guide the motion of the base 1206.

In addition, unlike the manifold 102, in the manifold 1202, the alignment assembly 1214 does not include a spherical seat. Rather, the alignment assembly 1214 includes a rounded knob 1278 that engages directly with the piston (not shown) of the jack 1210.

In the examples described above, the base and cover are forced together by actuating the jack to force the base towards the cover in a linear direction, while holding the cover stationary. In alternative examples, a base and cover can be forced together by, for example, forcing the cover towards the base while holding the base stationary, or by forcing both the base and the cover towards each other. Furthermore, in the examples described above, each assembly is oriented so that the cover is positioned above the base. In alternative examples, an assembly may be in another orientation, such as with a base above a cover, or so that the assembly is horizontally oriented.

As mentioned above, also disclosed herein are microfluidic chips that are strengthened (i.e. to have a relatively high burst strength) and that can optionally be used together with the manifolds disclosed herein (or with other manifolds), under high pressure conditions. The strengthened microfluidic chips can generally be of the same or similar configuration to microfluidic chip 104—i.e. can include a base panel in the form of a silicon wafer in which various microfluidic features are etched, and a cover panel in the form of a transparent glass panel. However, the glass panel can be chemically strengthened. More specifically, the surfaces of the glass panel can be enriched with potassium ions, which can strengthen the glass panel.

In general, in order to fabricate strengthened microfluidic chips, a borosilicate glass panel can be chemically treated to enrich the surfaces of the borosilicate glass panel with potassium ions, to yield a chemically strengthened glass panel; one or more microfluidic channels can be etched into a silicon wafer and the silicon wafer can be provided with one or more microfluidic inlets and microfluidic outlets (e.g. by drilling or etching); and the chemically strengthened glass panel can be bonded to the silicon wafer to cover the microfluidic channel.

More specifically, the silicon wafer can be prepared by etching and/or drilling, to provide the silicon wafer with various microfluidic features.

The chemically strengthened glass panel can be prepared by preheating a borosilicate glass panel and immersing the preheated panel in a molten bath of potassium nitrate, for example at a temperature of at least about 400 degrees Celsius for at least about 4 hours, to enrich the surfaces of the borosilicate glass panels with potassium ions and thus chemically strengthen the glass panel.

The chemically strengthened glass panel can then be bonded to the silicon wafer by anodic bonding. More specifically, the chemically strengthened glass panel and silicon wafer can be stacked and then bonded by heating the stack, applying pressure to the stack, and applying a voltage to the stack. The temperature can be, for example, up to about 500 degrees Celsius (e.g. about 400 degrees Celsius), the voltage can be, for example, up to about 2000 V (e.g. about 600 V), and this can be maintained for about 4 hours.

Optionally, the silicon wafer can be part of a larger silicon wafer, the borosilicate glass panel can be part of a larger glass panel, and after bonding the two together, the larger silicon wafer and larger glass panel can be diced, to yield the microfluidic chip.

Examples

Preparation of Chemically Strengthened Glass Panels

Potassium nitrate (600 g, Sigma Aldrich) was transferred to a stainless steel or copper plate and heated to 450 degrees Celsius in an oven. Five borosilicate glass panels in the form of microscope slides (Silicon Valley Microelectronics, thickness 1.75±0.1 mm) were pre-heated to 450 degrees Celsius in the oven, and then immersed in the molten salt for 4 hours. The borosilicate glass panels were then removed from the molten salt and washed with de-ionized water and dried with filtered nitrogen.

3-Point Bend Test

The chemically strengthened glass panels were subject to a 3-point bend test. Five non-strengthened borosilicate glass panels were used as a control. A slit was cut into a 2 inch×3 inch piece of plastic, and a mounting hole was drilled in the bottom of the piece of plastic. For each glass panel, the glass panel was held horizontally, and the piece of plastic was slid onto the glass panel via the slit, to the center of the glass panel. Opposite ends of the glass panel were then rested on two 1% inch stainless steel rods, mounted horizontally. Weight was then suspended from the hole in the plastic. The weight was increased incrementally until the glass panel broke.

Figure 13:
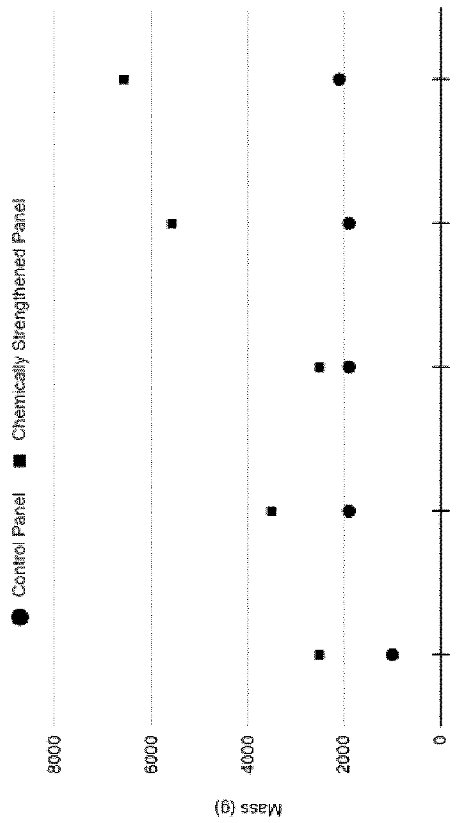
FIG. 13 is a plot showing the results of 3-point bend tests for control glass panels and chemically strengthened glass panels.

FIG. 13 shows the mass at which each glass panel broke. The chemically strengthened glass panels had a higher strength than the control panels.

Preparation of Control Microfluidic Chips

Silicon wafers were drilled and etched with microfluidic channels. Each silicon wafer was then anodically bonded to a control borosilicate glass panel (Silicon Valley Microelectronics, thickness 1.75±0.1 mm) by stacking the control borosilicate glass panel and the silicon wafer, heating the stack to 400 degrees Celsius, applying pressure, and applying a voltage of 600V across the stack. The stack was then slowly cooled, and diced into individual microfluidic chips.

Preparation of Chemically Strengthened Microfluidic Chips

Silicon wafers were drilled and etched with microfluidic channels.

Borosilicate glass panels (Silicon Valley Microelectronics, thickness 1.75±0.1 mm) were preheated to 450 degrees Celsius in an oven. Potassium nitrate (Sigma Aldrich) was preheated to 450 degrees Celsius in the oven. When the potassium nitrate was fully melted, the borosilicate glass panels were submerged in the potassium nitrate and left at 450 degrees Celsius for 4.5 hours. The borosilicate glass panels were then removed from the molten salt, cooled to room temperature, flushed with deionized water, and dried.

Each silicon wafer was then anodically bonded to a chemically strengthened glass panel by stacking the chemically strengthened glass panel and the silicon wafer, heating the stack to 400 degrees Celsius, applying pressure, and applying a voltage of 600V across the stack. The stack was then slowly cooled, and diced into individual microfluidic chips.

Burst Pressure Tests

The control microfluidic chips and the chemically strengthened microfluidic chips were mounted in a microfluidic manifold as shown in FIGS. 1 to 10A. Using a syringe pump, oil was injected into each microfluidic chip, while preventing outflow of the oil from the microfluidic chip. Pressure was monitored using a pressure sensor mounted between the syringe pump and the microfluidic manifold. Pressure was increased until the microfluidic chip burst, and the burst pressure was recorded.

Figure 14:
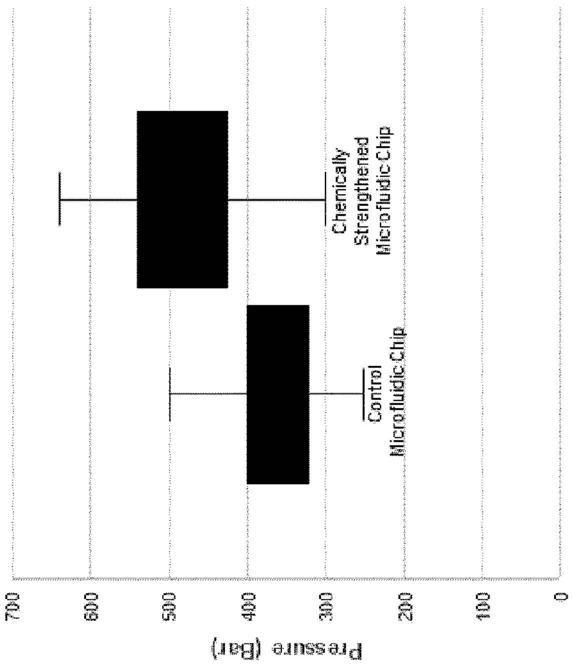
FIG. 14 is a plot showing the minimum, first quartile, third quartile, and maximum of burst pressure tests for control microfluidic chips and chemically strengthened microfluidic chips.
Figure 15:
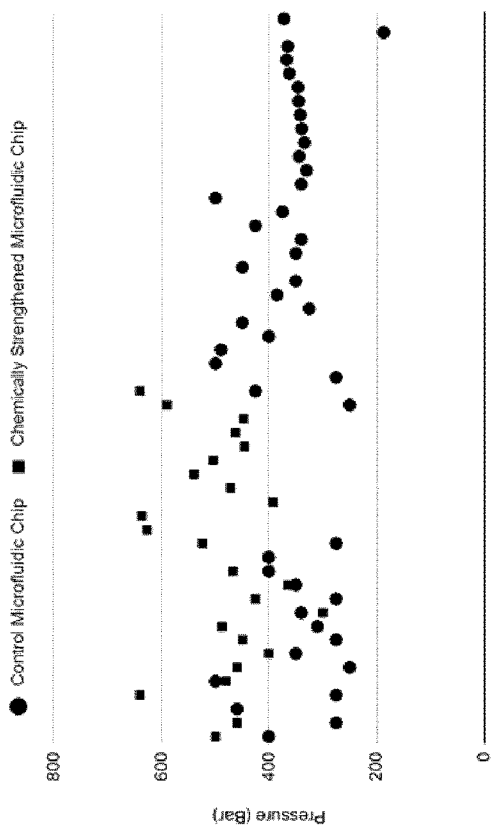
FIG. 15 is a plot showing all data points of burst pressure tests for control microfluidic chips and chemically strengthened microfluidic chips.

Table 1 shows a summary of the burst strength for control microfluidic chips (n=45) versus the burst strength for chemically strengthened microfluidic chips (n=26). These results are plotted in FIG. 14. FIG. 15 is a plot showing each individual data point.

TABLE 1

| | Min | Q1 | Median | Q3 | Max |
|---|---|---|---|---|---|
| Control Microfluidic Chips | 187 | 330 | 350 | 400 | 500 |
| Chemically Strengthened Microfluidic Chips | 300 | 446.5 | 470 | 536 | 740 |

The chemically strengthened microfluidic chips had a higher burst strength than the control microfluidic chips.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A microfluidic assembly comprising:

a microfluidic chip having at least a first microfluidic inlet, at least a first microfluidic outlet, and at least a first microfluidic channel that is in fluid communication with the first microfluidic inlet and the first microfluidic outlet;

a base against which the microfluidic chip is seated, wherein the base comprises a base block and at least a first seal, wherein the base block has at least a first fluid channel extending therethrough for delivering fluid to the microfluidic chip, and the first fluid channel has a first end that is positioned to receive fluid from a fluid source and a second end that is positioned to deliver the fluid to the first microfluidic inlet of the microfluidic chip, and wherein the first seal is positioned to seal the second end to the first microfluidic inlet;

a cover positioned over the microfluidic chip and configured for bearing against the microfluidic chip, wherein at least one of the base and the cover has a viewing window that is alignable with the microfluidic chip and configured for allowing optical access to the first microfluidic channel;

a jack configured to force the base and the cover together to sandwich the microfluidic chip between the base and the cover with the base and the cover bearing against the microfluidic chip in order to apply a confining pressure to the microfluidic chip, and with the first seal compressed between the microfluidic chip and the base block in order to seal the first fluid channel in fluid communication with the first microfluidic inlet; and a rounded knob fixed to the base and extending towards the jack, wherein the rounded knob is configured such that motion generated by actuating the jack is transferred from the jack to the base via the rounded knob in order to compensate for angle misalignment between the base and the jack.

2. The microfluidic assembly of claim 1, wherein the jack is a hydraulic jack.

3. The microfluidic assembly of claim 1, wherein the jack has a capacity of at least 5 tons of force.

4. The microfluidic assembly of claim 1, wherein the jack is configured to force the base towards the cover in a linear direction while the cover is held stationary.

5. The microfluidic assembly of claim 4, further comprising a frame supporting the cover and holding the cover stationary when the base is forced towards the cover.

6. The microfluidic assembly of claim 5, wherein the frame comprises:

a plate to which the jack is secured; and a support extending from the plate and supporting the cover at a fixed distance from the plate.

7. The microfluidic assembly of claim 6, wherein the support comprises a first post and a second post extending orthogonally from the plate in a linear direction and positioned on opposed sides of the jack.

8. The microfluidic assembly of claim 7, wherein the base is engaged with the frame and is slidable along the frame in the linear direction when the base is forced towards the cover.

9. The microfluidic assembly of claim 8, further comprising a first slider and a second slider fixed to the base, wherein the first slider and second slider are engaged with the first post and the second post respectively and are slidable along the first post and second post in the linear direction when the base is forced towards the cover.

10. The microfluidic assembly of claim 5, wherein the cover is pivotably mounted to the frame and is pivotable away from the base to allow access to the microfluidic chip.

11. The microfluidic assembly of claim 1, further comprising a rounded seat positioned between the jack and the rounded knob, and wherein the rounded knob is received in the rounded seat to transfer the motion generated by the jack from the jack to the base via the rounded seat and the rounded knob.

12. The microfluidic assembly of claim 1, wherein the cover comprises a main body having a recess facing towards the base;

the cover comprises the viewing window and the viewing window extends through the main body to the recess; and a transparent panel is seated in the recess.

13. The microfluidic assembly of claim 1, wherein the microfluidic chip comprises a silicon wafer in which the first microfluidic channel is etched and in which the first microfluidic inlet and first microfluidic outlet are formed, and a chemically strengthened glass panel bonded to the silicon wafer to cover the first microfluidic channel.

14. A microfluidic manifold comprising:

a base against which a microfluidic chip is seatable, the base comprising a base block and at least a first seal, wherein the base block has at least a first fluid channel extending therethrough for delivering fluid to the microfluidic chip, and the first fluid channel has a first end that is positioned to receive fluid from a fluid source and a second end that is positioned to deliver fluid to the microfluidic chip, and wherein the first seal is configured and positioned to seal the second end to the microfluidic chip;

a cover positionable over the microfluidic chip and configured for bearing against the microfluidic chip, wherein at least one of the base and the cover comprises a viewing window configured for allowing optical access to the microfluidic chip; and a jack configured to force the base and the cover together, wherein when the microfluidic chip is seated against the base and the base and the cover are forced together, the microfluidic chip is sandwiched between the base and the cover with the base and the cover bearing against the microfluidic chip in order to apply a confining pressure to the microfluidic chip, and with the first seal compressed between the microfluidic chip and the base block in order to seal the fluid channel in fluid communication with the microfluidic chip; and a rounded knob fixed to the base and extending towards the jack, wherein the rounded knob is configured such that motion generated by actuating the jack is transferred from the jack to the base via the rounded knob in order to compensate for angle misalignment between the base and the jack.

15. A method for operating a microfluidic assembly, comprising:

a. seating a microfluidic chip against a base;

b. with a cover positioned over the microfluidic chip, actuating a jack to force the base and the cover together to sandwich the microfluidic chip between the base and the cover to thereby apply a confining pressure to the microfluidic chip and seal a first fluid channel of the base in fluid communication with a first microfluidic inlet of the microfluidic chip; and C. forcing a fluid through the first fluid channel and into the first microfluidic inlet;

wherein step b. comprises transferring motion from the jack to the base via a rounded knob secured to the base and a rounded seat positioned between the base and the jack, to compensate for angle misalignment between the base and the jack.

16. The method of claim 15, wherein step b. comprises actuating the jack to force the base towards the cover.

17. The method of claim 15, wherein step b. comprises actuating the jack to force the base to slide along a frame towards the cover.

18. The method of claim 15, wherein step b. comprises actuating the jack to apply at least 5 tons of force to the base.

19. The method of claim 15, wherein step c. comprises forcing the fluid into the first microfluidic inlet at a pressure of at least 300 bar.

20. The method of claim 15, wherein step b. comprises compressing a seal of the base against the microfluidic chip to seal the first fluid channel in fluid communication with the first microfluidic inlet.

21. The method of claim 15, wherein actuating the jack comprises pumping a hydraulic fluid into a cylinder of the jack.

22. The method of claim 15, further comprising pivoting the cover away from the base to access the microfluidic chip.

* * * * *